United States Patent [19]

Tokunaga et al.

[11] Patent Number: 5,511,939
[45] Date of Patent: Apr. 30, 1996

[54] MULTI-BLADES FAN DEVICE

[75] Inventors: Takahiro Tokunaga, Kosai; Yukio Uemura, Kariya; Hideo Asano, Gifu; Hikaru Sugi, Nagoya; Teruhiko Kameoka, Okazaki; Yasushi Kondo, Chiryu, all of Japan

[73] Assignee: Nippondenso Co., Ltd., Kariya, Japan

[21] Appl. No.: 280,998

[22] Filed: Jul. 27, 1994

Related U.S. Application Data

[62] Division of Ser. No. 20,085, Feb. 19, 1993, Pat. No. 5,352,089.

[30] Foreign Application Priority Data

| Feb. 19, 1992 | [JP] | Japan | 4-032156 |
| Feb. 28, 1992 | [JP] | Japan | 4-043289 |
| Apr. 28, 1992 | [JP] | Japan | 4-110145 |
| Dec. 25, 1992 | [JP] | Japan | 4-345818 |
| Dec. 25, 1992 | [JP] | Japan | 4-345819 |

[51] Int. Cl.$^6$ ................................ F04D 17/08
[52] U.S. Cl. ............ 415/206; 415/172.1; 415/119
[58] Field of Search ............. 415/119, 172.1, 415/173.1, 173.6, 204, 206; 416/186 R

[56] References Cited

U.S. PATENT DOCUMENTS

| 909,863 | 1/1909 | Bowie | 415/204 |
| 4,432,694 | 2/1984 | Kuroda et al. | 415/172.1 |

FOREIGN PATENT DOCUMENTS

| 0058200 | 4/1984 | Japan | 415/119 |
| 59-196998 | 11/1984 | Japan | |
| 145497 | 7/1985 | Japan | 415/206 |
| 0126300 | 6/1987 | Japan | 415/121.2 |
| 1108399 | 7/1989 | Japan | |
| 1108398 | 7/1989 | Japan | |
| 0733533 | 7/1955 | United Kingdom | 415/206 |

*Primary Examiner*—Edward K. Look
*Assistant Examiner*—James A. Larson
*Attorney, Agent, or Firm*—Cushman, Darby & Cushman

[57] ABSTRACT

A multi-blade fan having a fan assembly including a bottom plate and a plurality of circumferentially spaced blades and a casing for the fan assembly therein having an outlet duct extending therefrom for discharge of the air flows. The fan assembly includes an annular shroud connected to the axial ends of the blades remote from the bottom plate. The casing includes a bottom wall for rotatably connecting the fan assembly, a top wall for defining an air inlet for axially introducing the air into the casing, and a tubular wall connecting the bottom and top walls. The top wall of the casing adjacent to the inlet opening forms an annular projection having a bell cross sectional shape opened inwardly so that an axial end of the shroud extends thereto. The bell cross section portion radially extends to a portion that is inclined downwardly in the outward direction, which faces the shroud so that a small gap extending radially is created. The top wall or bottom wall of the casing at its radially outer portion can be downwardly inclined. The tubular wall of the casing can also be inclined so that the bottom end of the tubular wall is flared radially outward from its center.

4 Claims, 26 Drawing Sheets

( 16TH EMBODIMENT )

(1ST EMBODIMENT)

(2ND EMBODIMENT)

(3RD EMBODIMENT)

(4TH EMBODIMENT)

(5TH EMBODIMENT)

(6TH EMBODIMENT)

(7TH EMBODIMENT)

( 8TH EMBODIMENT )

(9TH EMBODIMENT)

(10TH EMBODIMENT)

(11TH EMBODIMENT)

(12TH EMBODIMENT)

( 13TH EMBODIMENT )

(14TH EMBODIMENT)

(15TH EMBODIMENT)

(16TH EMBODIMENT)

MULTI-BLADES FAN DEVICE

This is a division of application Ser. No. 08/020,085, filed Feb. 19, 1993, U.S. Pat. No. 5,352,089.

BACKGROUND OF THE INVENTION

1. Field of the Invention

The present invention relates to a centrifugal type fan, which is particularly suitable for use in an air conditioning apparatus of an automobile.

2. Description of a Related Art

Known in a prior art is a multi-blade fan device as disclosed in the Japanese Un-Examined Patent Publication No. 2-146298 and Japanese Un-Examined Patent Publication No. 2-151519, where a fan assembly having a plurality of blades is stored in a fan casing defining an inlet (mouth) for air introduced into the casing by the rotational movement of the fan assembly.

Such a prior art fan device is defective in that its operational noise is high and its fan efficiency is low due to the creation of turbulence in the casing because of the occurrence of a reverse flow or vortex.

SUMMARY OF THE INVENTION

An object of the present invention is to provide a multi-blade fan device with an improved construction capable of avoiding the above mentioned drawbacks existing in the prior art.

According to a first aspect of the invention, a fan device is provided, comprising:

a casing having a tubular body portion having axially spaced first and second end walls and a tubular side wall connecting the first and second end walls to each other, and a discharge duct connected to the body portion;

the first wall having an opening that is coaxial with respect to the axis of the casing;

a fan assembly arranged in the casing so that a passageway is created in the casing around the fan assembly so that the width of the passageway gradually increases in the circumferential direction until the passageway is connected to the duct, and;

said fan assembly being constructed by a base plate rotatably supported by the casing at the second wall, a plurality of blades fixedly connected to the outer periphery of the base plate so that the blades are circumferentially spaced, and an annular shroud connected to the edges of the blades spaced from the base plate;

said first wall forming a first portion, adjacent to said opening, having an recessed cross sectional shape;

the first wall having a second portion extending radially outwardly from said first portion; said second portion being arranged adjacent to the shroud of the fan assembly so that a small, annular gap is created between the guide portion of the casing and the shroud of the fan assembly.

According to the second aspect of the invention, a fan device is provided, comprising:

a casing having a tubular body portion having axially spaced first and second end walls and a tubular side wall connecting the first and second end walls to each other, and a discharge duct connected to the body portion;

the first wall having an opening that is coaxial with respect to the axis of the casing;

a fan assembly arranged in the casing so that a passageway is created in the casing around the fan assembly so that the width of the passageway gradually increases in the circumferential direction until the passageway is connected to the duct;

said fan assembly being constructed by a base plate rotatably supported by the casing at the second wall, and a plurality of blades fixedly connected to the outer periphery of the base plate so that the blades are circumferentially spaced;

said first wall being inclined toward the second wall in a radially outward direction.

BRIEF EXPLANATION OF ATTACHED DRAWINGS

FIGS. 1(A) and (B) are partial cross sectional shapes of a fan device in the prior arts, respectively.

Figure 16:
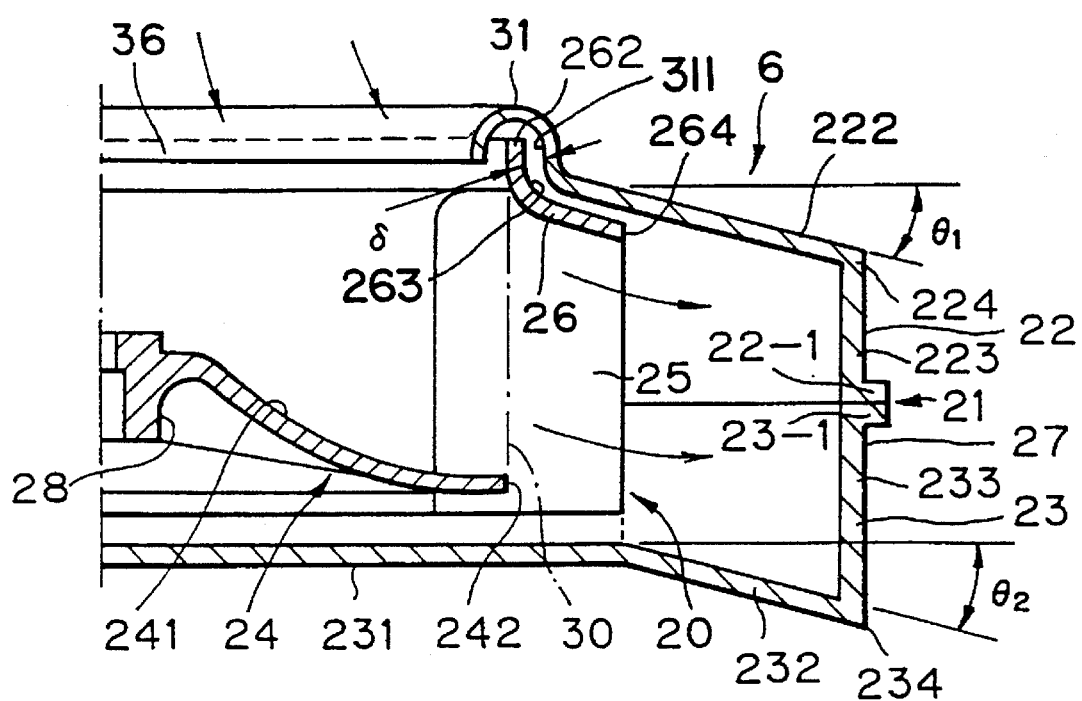
FIG. 16 is a partial enlarged view of the cross section of the fan device in FIG. 15.
Figure 25A:
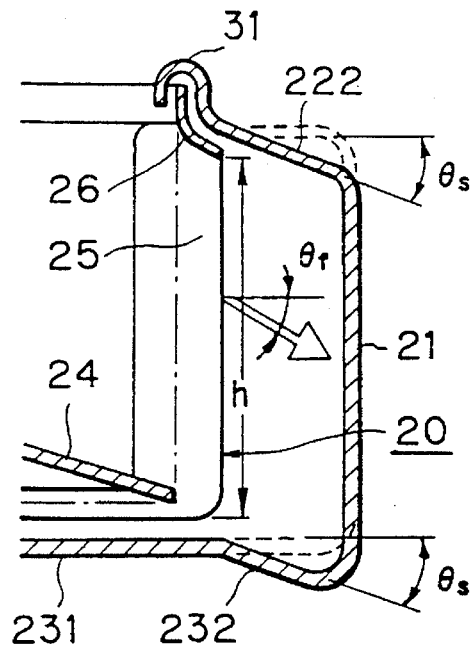

FIG. 25(A) corresponds to FIG. 16, but illustrates a relationship between the air flow angle and the inclination of the top and bottom walls.

Figure 25B:
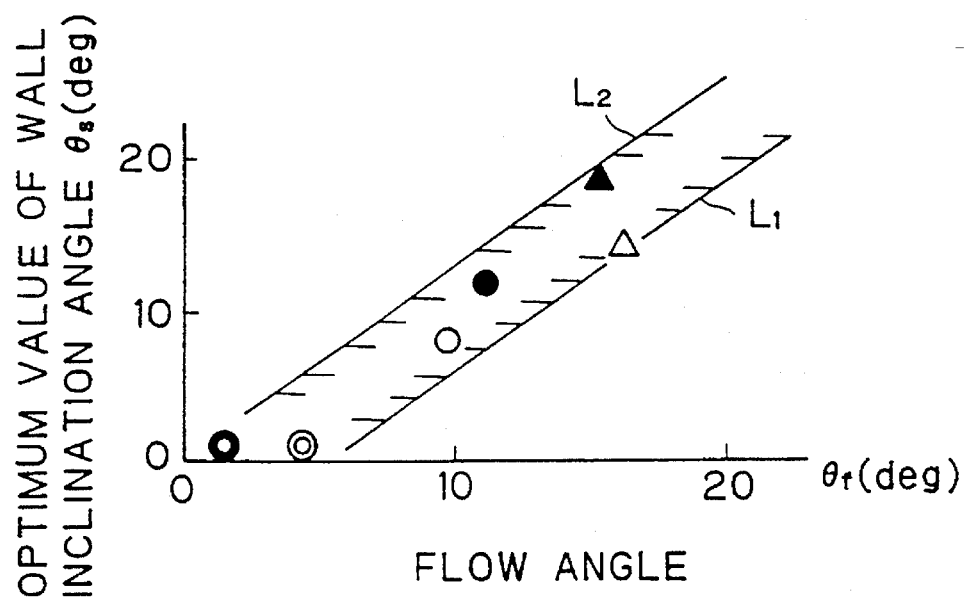

FIG. 25(B) shows the relationship between the air flow angle and the optimum wall inclination angles.

Figure 26:
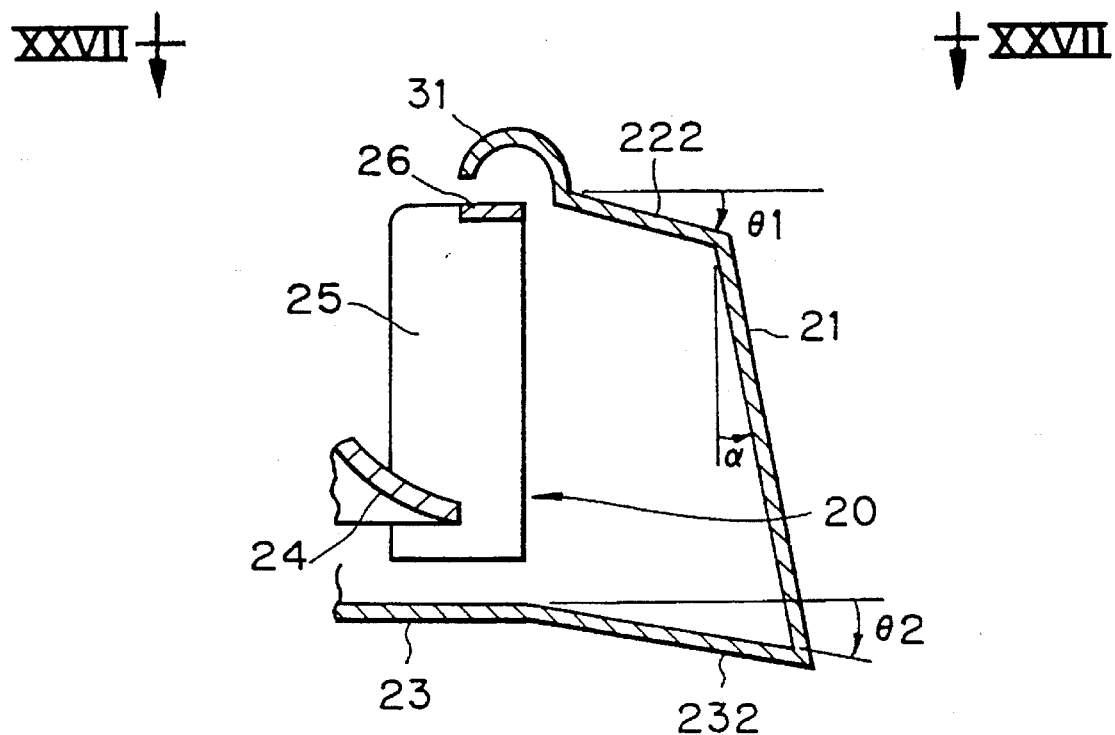

FIG. 26 is a partial cross sectional view of the fan device of a different embodiment of the present invention.

Figure 27:
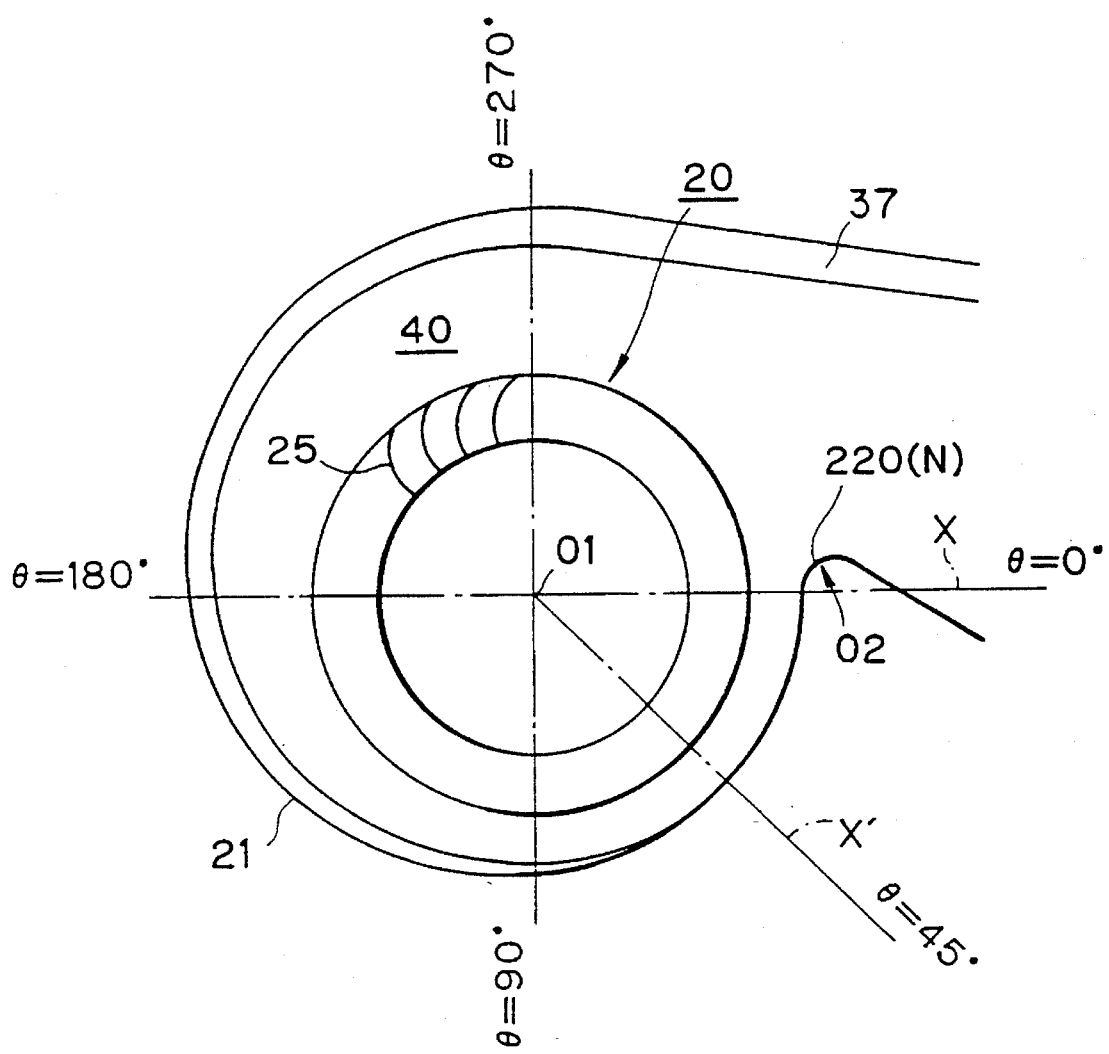

FIG. 27 is a side view of the fan casing taken along line XXVII in FIG. 26.

Figure 28:
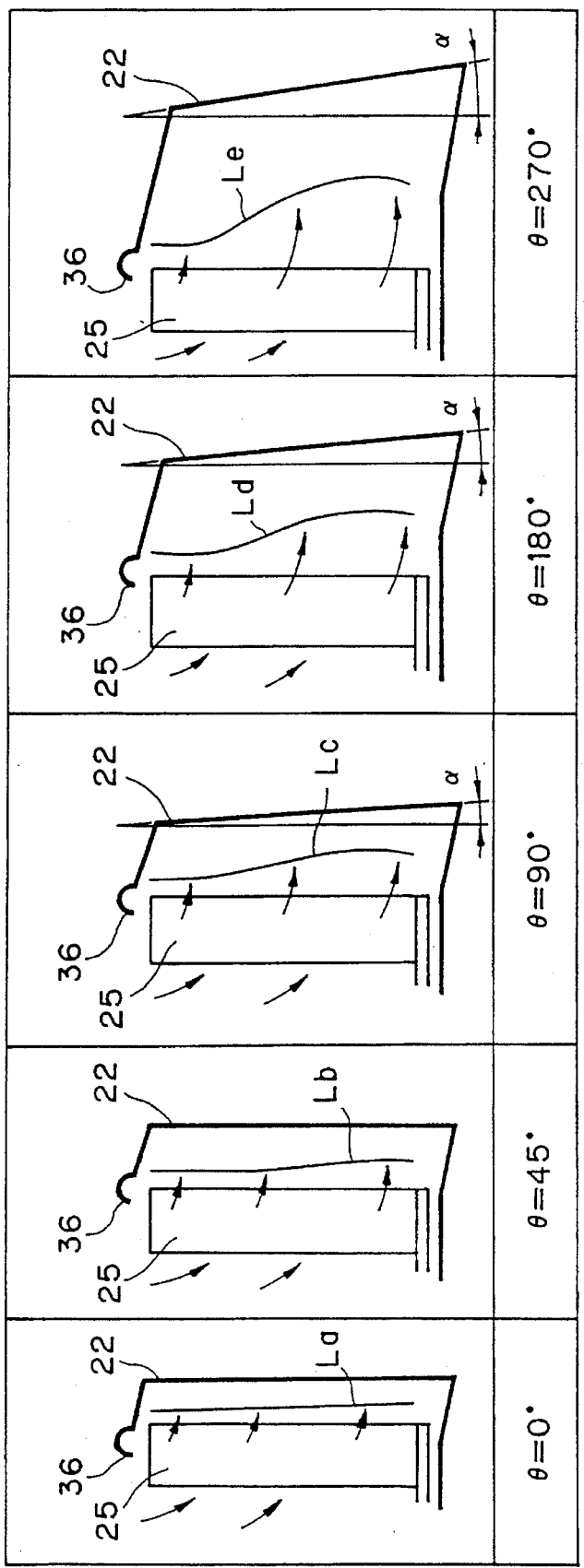

FIGS. 28 A–E illustrate the arrangement of the side wall of the fan casing with respect to the blades for various values of the scroll angle in the embodiment in FIG. 26.

Figure 29:
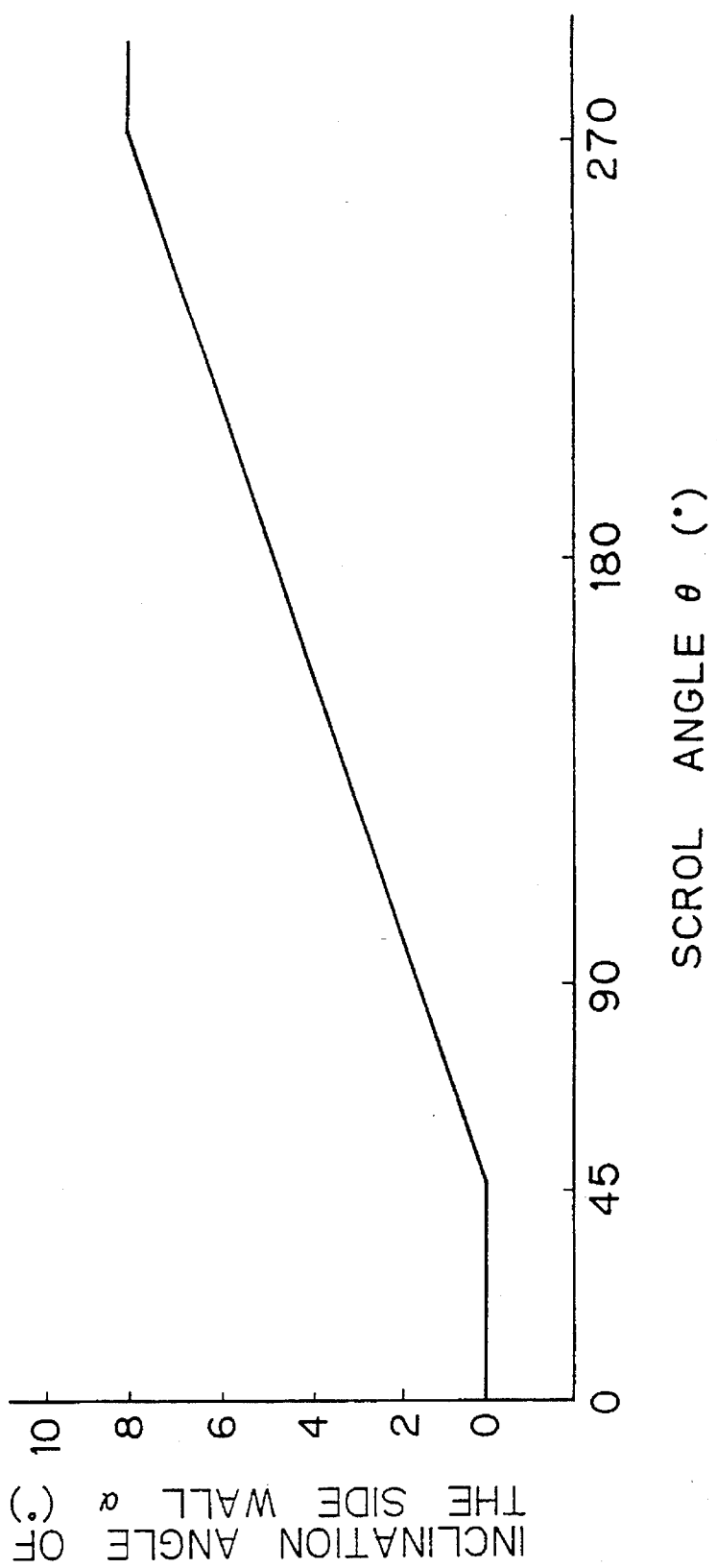

FIG. 29 shows the relationship between the scroll angle and the inclination angle.

Figure 30:
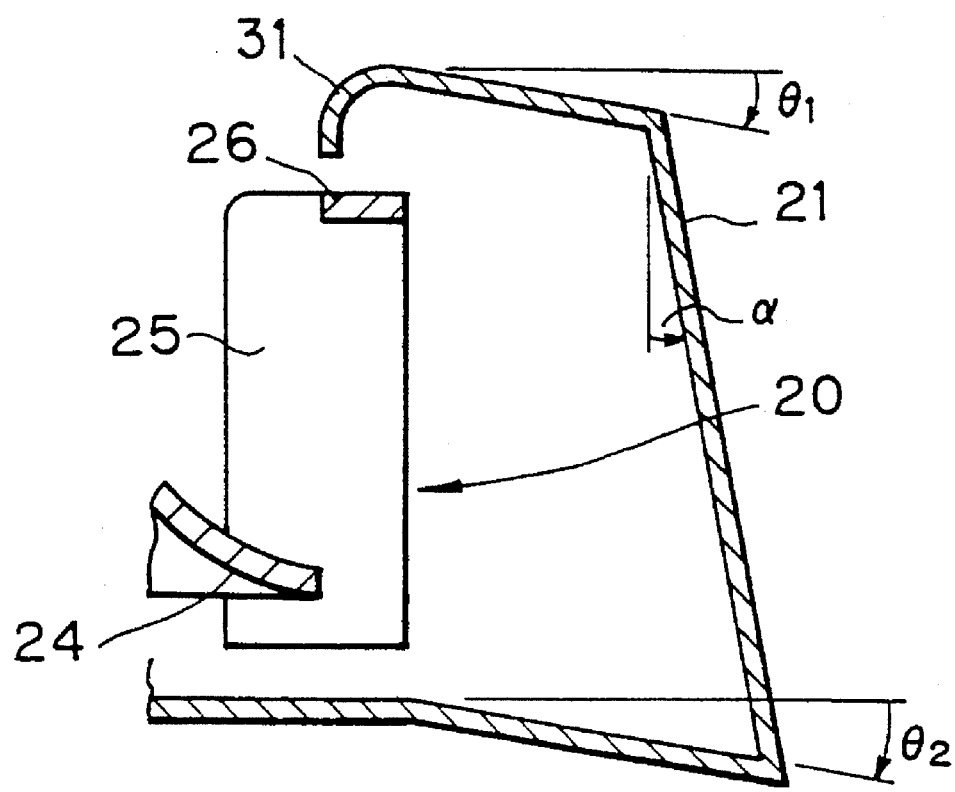
Figure 31:
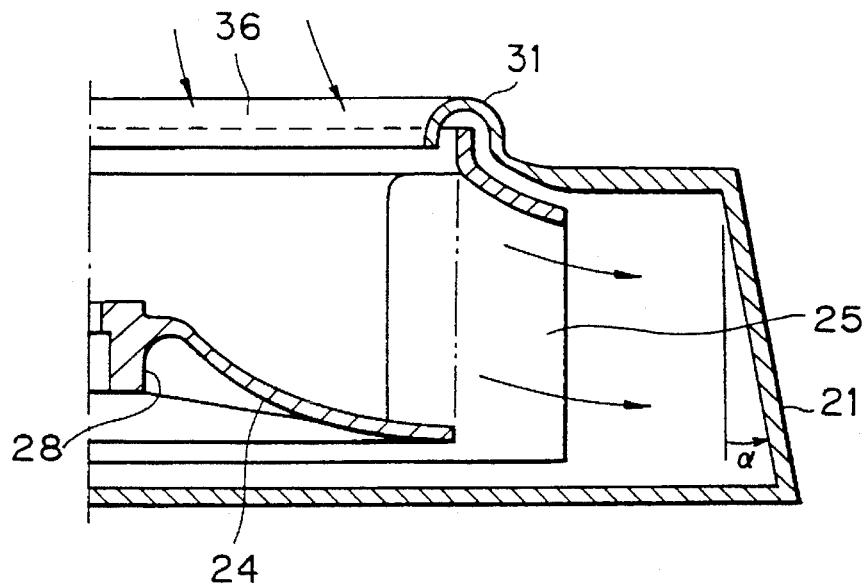
Figure 32:
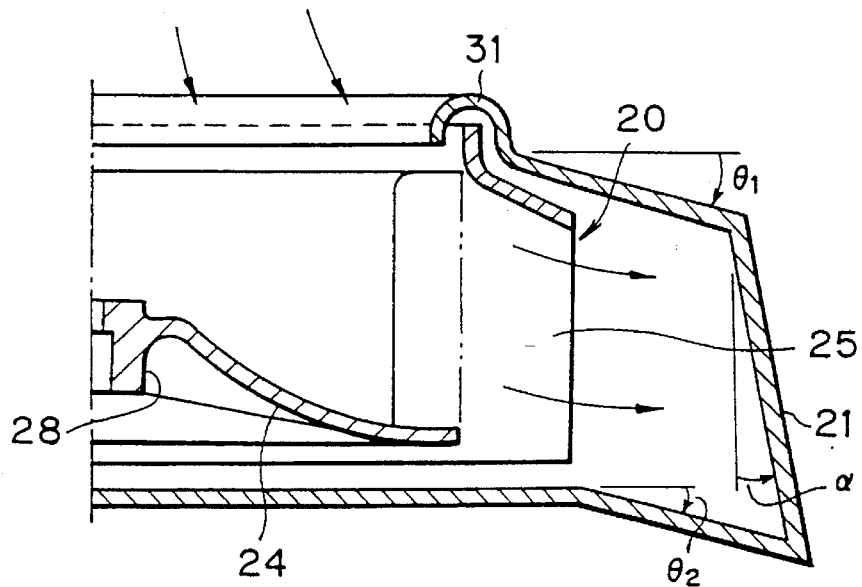

FIGS. 30, 31 and 32 are similar to FIG. 26, but show different embodiments of the invention respectively.

DESCRIPTION OF PREFERRED EMBODIMENTS

Figure 1A:
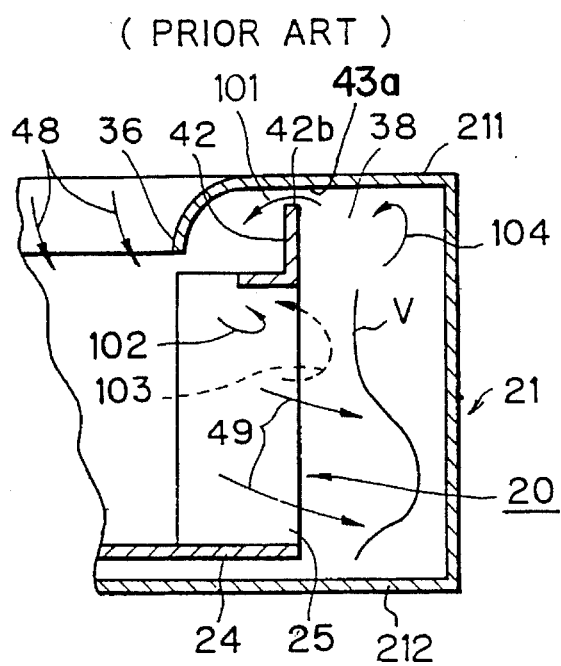

A problem to be solved by the present invention will be explained with reference to FIGS. 1(a) and 1(b), which show constructions of a centrifugal fan for an air conditioning apparatus of an automobile in the prior arts. FIG. 1(a) shows a partial arrangement of a fan assembly in a prior art. The fan assembly is constructed by a centrifugal fan 20 having a plurality of circumferentially spaced blades 25 between a bottom plate 24 and a top or retaining ring 42 having an L cross sectional shape, and a casing 21 for storing the fan 20. The casing 21 has a top wall 211 defining a central inlet (mouth) 36 opened axially with respect to the fan 20, so that the rotational movement of the fan 20 causes the air to be drawn into the fan 20 fan via the inlet opening 36 as shown by arrows 48, and to be directed radially outwardly as shown by arrows 49 between the blades 25.

Tests conducted by the inventor on the prior art have revealed that reverse flows between the tip end 42b and the inner surface 43a of the casing 21, as shown by an arrow 101, and reverse flows or vortexes at the upper part of passageways between the blades 25 or at the location radially outwardly of the retainer ring 42, as shown by arrows 102, 103 and 104, are apt to occur. These reverse flows or vortexes occur independently from the amount of blown air, thereby reducing the operational stability of the fan, and wasting the driving power of the fan. Furthermore, turbulence are apt to occur in the drawn air flows via the inlet 36 or the discharged air flow, thereby increasing the operational noise and reducing the fan efficiency.

Furthermore, tests conducted by the inventor have also revealed that, in the prior art construction, a velocity distribution along the height of the blades is as shown by a line V, which means that a substantial flow of air is only locally obtained at the bottom portion of the space inside the casing 21, and the upper portion of the space inside the casing 21 is a dead space 38, whereat an air flow does not substantially occur. Such a dead space 38 necessarily may generate a vortex on one hand, and increase the operational noise and reduce fan efficiency on the other hand.

Figure 1B:
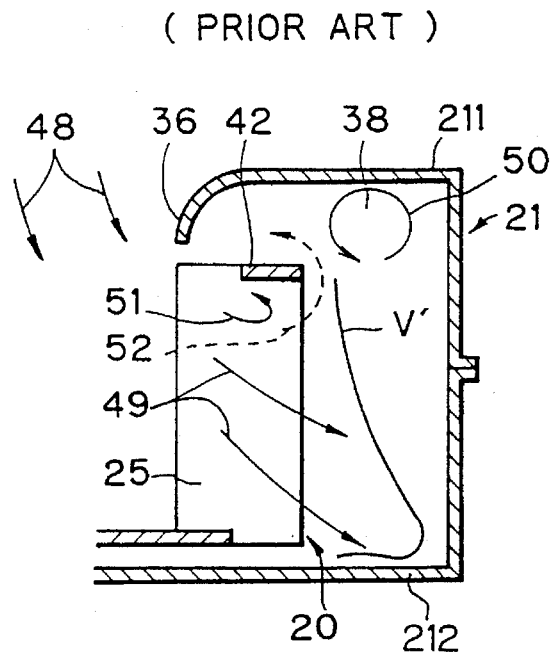

Also known in the prior art is a fan device as shown in FIG. 1(b), where a plurality of circumferentially spaced blades are arranged between a bottom plate 24 and a retainer ring 42 as an annular flat plate connected to the top edges of the blades 25.

The problems as mentioned with reference to FIG. 1(a) also occur in the prior art construction in FIG. 1(b). Namely, the reverse flows as shown by arrows 51 and 52 are apt to be generated and a vortex as shown by arrow 50 is generated at the top portion of the space inside the casing 21. Furthermore, the air flow distribution along the vertical length of the blades is as shown by an a line V', which means that a uniform air flow can not be obtained along the entire length of the fan.

Figure 2A:
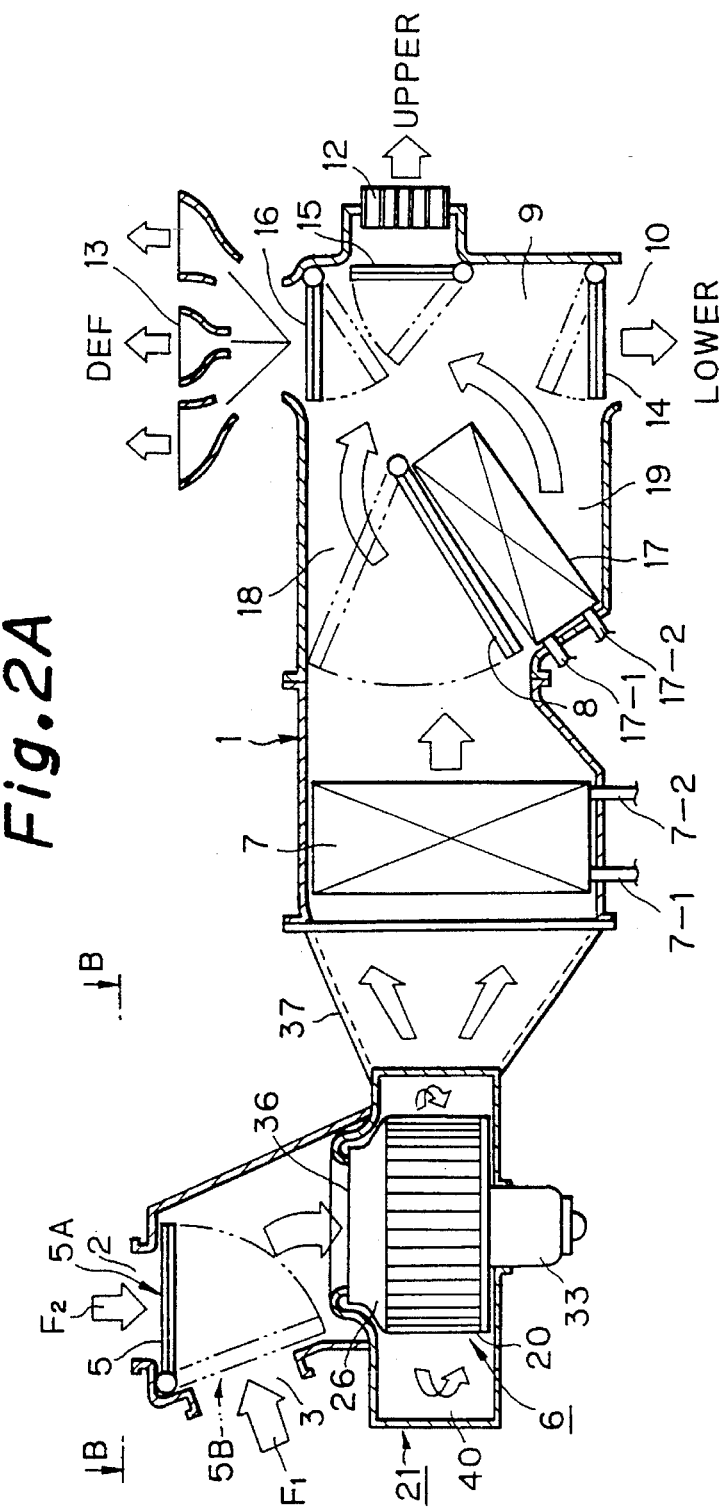
FIG. 2A is a cross sectional view of an air conditioning device for an automobile to which the fan device according to the present invention is applied.

In FIG. 2A, which shows an air conditioning apparatus for an automobile, a reference numeral 1 denotes a duct assembly, which forms an outside air inlet 2 for introducing an amount of external air (not shown), and an inside air inlet 3 for introduction of an amount of internal air. A fan assembly 6 is arranged inside the duct 1 for generating a forced flow of air introduced into the duct via the inside air inlet 2 or the outside air inlet 3. The fan assembly 6 is constructed by a fan case 21 provided with an air inlet 36, a centrifugal fan 20 subjected to a rotating movement for drawing axially an amount of air flow via the inlet 36 and for discharging the air radially outwardly, and an electric motor 33 connected to the fan 20 for imparting a rotational movement to the fan 20. The air flows as radially discharged from the fan 20 are, via an outlet duct 37, directed to an evaporator 7 arranged in the duct 1 at a position located downstream from the fan assembly 6. The evaporator 7 is a heat exchanger for obtaining a heat exchange between the air in the duct and a refrigerant passing through the evaporator 7. The evaporator 7 is provided with an inlet 7-1 for the refrigerant and an outlet 7-2 for the refrigerant. A switching damper 5 is arranged in the duct 1 so that it moves between a position 5A (solid line) where the outside air inlet 2 is closed, and the inside air inlet 3 is opened for introduction of the inside air from the cabin into the duct 1 as shown by an arrow $F_1$, and a position 5B (dotted line) where the inside air inlet 3 is closed and the outside air inlet 2 is opened for introduction of air outside the cabin into the duct 1, as shown by an arrow $F_2$.

An air mix damper 8 is arranged in the duct 1 at a position located downstream from the evaporator 7 so that the air mix damper 8 creates first and second air passageways 18 and 19. The air mix damper 8 controls the ratio between the amount of air passing through the first passageway 18 and the amount of air passing through the second passageway 19 in accordance with the degree of the opening of the air mix damper 8. A heater core 17 is arranged in the second passageway 19 and is connected to a hot water source, such as engine cooling water, so that a heat exchange is obtained between the air in the duct 1 and the hot water in the heater core 17, for heating the air passing through the second air passageway 19. The heater core 17 has an inlet 17-1 and an outlet 17-2 for the hot water. The first and second air passageways 18 and 19 are, at their downstream ends, combined to an air mix chamber 9. Opened to the air mix chamber 9 is a lower outlet 10 for discharging air flows directed to the lower parts of a passenger, an upper outlet 12 for discharging air flows directed to the upper parts of a passenger, and top outlets 13 for discharging air flows directed to the top parts of the cabin. Dampers 14, 15 and 16 are provided for controlling the flow of air from the outlets 10, 12 and 13, respectively.

Figure 2B:
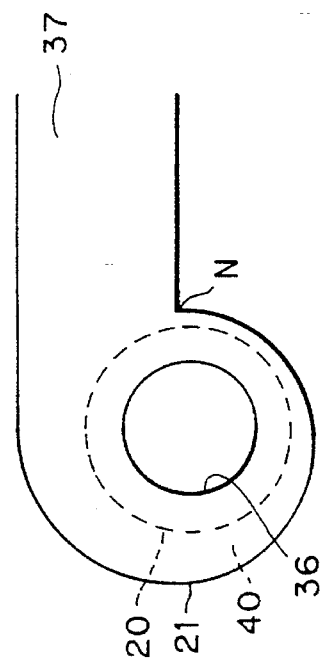
FIG. 2B is a schematic side view of a fan device according to the present invention illustrating its scroll shaped casing, taken along line B—B in FIG. 2A.
Figure 3:
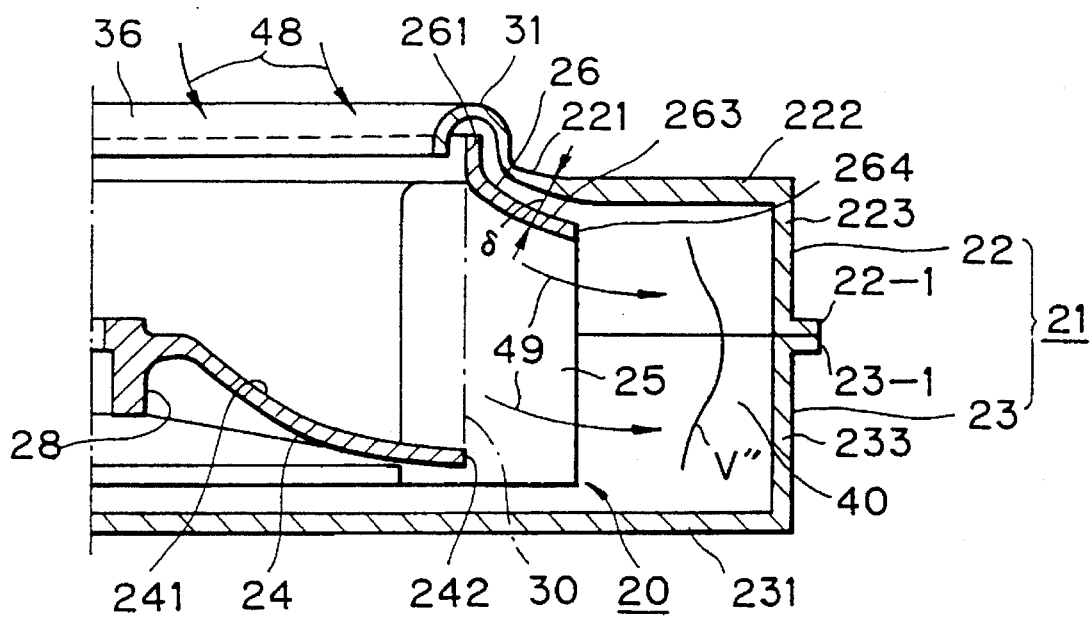
FIG. 3 is an enlarged cross sectional view of the fan assembly according to the present invention.

FIG. 3 shows a detailed construction of the fan assembly, which is constructed, basically, by the centrifugal fan 20 and the casing 21. The casing 21 is constructed by an upper part 22 and a lower part 23, which are made as a mold from a certain plastic resin material. The upper and lower parts 22 and 23 are formed with faced flange sections 22-1 and 23-1, which are connected to each other by suitable means, such as clamps or bolts and nuts. The casing 21 together with an outlet duct 37 forms, as shown in FIG. 2B, a scroll shape. Namely, the outlet duct 37 extends tangential from the casing 21. In the casing 21, a scroll passageway 40 is created radially outward from the fan 20, and the radial width of the scroll passageway 40 is from a nose point N gradually increasing in the circumferential direction up to a location where the scroll passageway 40 is connected to the duct 37.

In FIG. 2A, the electric motor 33 for operating the fan 20 has a housing connected to the bottom of the casing 21 and a rotating shaft (not shown) connected to the fan 20 for imparting a rotational movement thereto. As shown in FIG. 3, the fan 20 is constructed by a bottom plate 24 having a central boss portion 28, a plurality of blades 25, each extending axially from the bottom plate 24, and a shroud 26 as a strengthening ring plate connected to the ends of the blades 25. Connected to the boss portion 28 of the fan 20 is a rotating shaft (not shown) of the fan 33 (FIG. 2) for imparting a rotational movement of the shaft to the fan 20. It should be noted that, as shown in FIG. 3, the bottom plate 24 is convexed axially upward from the outer peripheral portion 242 to the center portion 241. The blades 25 are connected to the outer peripheral portion 242 of the bottom plate 24 of the fan 20, and these blades are arranged along the circumference of the outer periphery 242 of the bottom plate 24 so that they are equiangularly spaced. As shown in FIG. 3, a shroud member 26 has an axially extending annular projection 261 extending from the top edges of the blades 25. The annular projection 261 has an inner surface that is located on the same radius as that of the outer periphery of the bottom plate 24, so that a division line 30 for a mold is created. It should be noted that the shroud 26 has an outer annular portion 263 having a smoothly curved cross sectional shape extending radially and outwardly while inclined toward the bottom wall of the casing 21, to which portion 263 the top edges of the blades 25 are connected.

The casing 21, in which the fan assembly 22 is stored, forms an inner circular portion (mouth) 31, inwardly of which, the axial inlet 36 for the air to be drawn is created. The portion 31 forms, along its cross section, a bell shaped (semicircular) cross section, to which the tubular projection 261 of the shroud 26 extends, and located around the mouth 31 is an intermediate portion 221 that is inclined downwardly while facing the portion 263 of the shroud 26, so that a spacing δ of a value of about 3 mm is created between the faced annular surfaces of the portion 263 of the shroud 26 and the portion 221 of the top wall of the casing 21. Such an annular spacing of about 3 mm with respect to the casing 22 extends along the entire radial extension of the curved upper surface 263 of the shroud 26, namely up to the outer peripheral end 264 of the shroud 26.

As shown in FIG. 3, the intermediate portion 221 radially and outwardly extends to an outer top wall portion 222 extending in a plane transverse to the axis of the rotation of the fan 20.

The lower casing 23 has a bottom wall 231 extending in a plane transverse to the axis of the rotation of the fan 20. The upper casing 22 has a tubular outer wall 223 connected to the outer end of the top wall 222 up to the flange portion 22-1, while the lower casing 23 has a tubular outer wall 233 extending from the outer end of the bottom wall 231 up to the flange portion 23-1.

The casing according to the first embodiment is constructed by the upper and lower casings 22 and 23 having tubular walls 223 and 233, which form a tubular outer wall when they are connected to each other via the flanges 22-1 and 23-1.

An operation of the first embodiment as explained above will be explained with reference to that in the prior art. A rotation of the fan 20 causes the air to be drawn in the direction substantially axially as shown by the arrows 48. The drawn air flow gradually changes to a radial direction, and finally flows radially, as shown by the arrows 49, between the blades 25 to the scroll chamber 40. According to the present invention, a small long gap δ is created between the faced surfaces of the shroud 26 and the top wall of the casing 21, so that a reverse flow is prevented, and a smooth flow of air from the inlet 36 to the blades is obtained. As a result, efficiency is increased and there is a low level of noise. Contrary to this, in the prior art as shown in FIG. 1(a), a reverse flow, as shown by an arrow 101, is apt to be generated due to the fact that only a limited length small gap is located between the retainer 42 and the inner surface of the casing 21, thereby reducing the fan efficiency and increasing the operational noise.

According to a visualized test using a spark tracing method, the prior art construction can obtain a velocity distribution of air as drawn via the inlet opening 36, as shown by a line V in FIG. 1(a) such that the air flows are, as shown by the arrows 49, apt to be concentrated at a lower portion of the blades 25, and only a limited amount of air flow is obtained at the upper portion of the blades 25. Thus, a slight increase in flow resistance causes a vortex or reverse flows, as shown by an arrows 102 and 103, to occur in the upper part of the blades 25.

Contrary to this, according to the present invention, as shown in FIG. 3, a shroud 26 at the top of the blades 25 extends along the direction of the air flows 48 as drawn from the inlet opening 36, while the upper wall 221 of the casing of the constant small spacing of δ with respect to the shroud 26 extends in the same direction, which is very effective for preventing reverse flows in the prior art.

The provision of the shroud 26 having this construction is very effective in obtaining flows of air having substantially equalized speeds from the top end to the bottom end of the outer peripheral edge of the fan, as shown by a line V" in FIG. 3, which effectively prevents reverse flows from being generated.

According to the test conducted by the inventors, an increase in fan efficiency of about 3 percent and a decrease in the noise level for 1.5 dB can be realized, over the construction in the prior art as shown in FIG. 1(a).

The centrifugal flow type fan is suitable for use in an air conditioning apparatus of an automobile in that a large amount of air flow can be obtained irrespective of a small value of static pressure. In the prior art fan of this type as shown in FIGS. 1(a) and (b), a distribution of the air flow speed along the axial length is shown by a curve V or V', providing an area 38 in the upper space inside the casing 21, where no air flow is substantially created other than a vortex 104. The vortex as generated causes the air flows 49 as discharged to be turbulent, thereby increasing operational noise, and reducing efficiency. Contrary to this, according to the invention as shown in FIG. 3, the dead space in the prior art in FIG. 1(a) and (b) is eliminated due to the limited space between the faced surfaces of the shroud and the casing having a spacing δ. As a result, a smooth flow of air is obtained, thereby preventing vortex from occurring in the casing 21. Thus, fan efficiency can be increased, while reducing operational noise.

Figure 4:
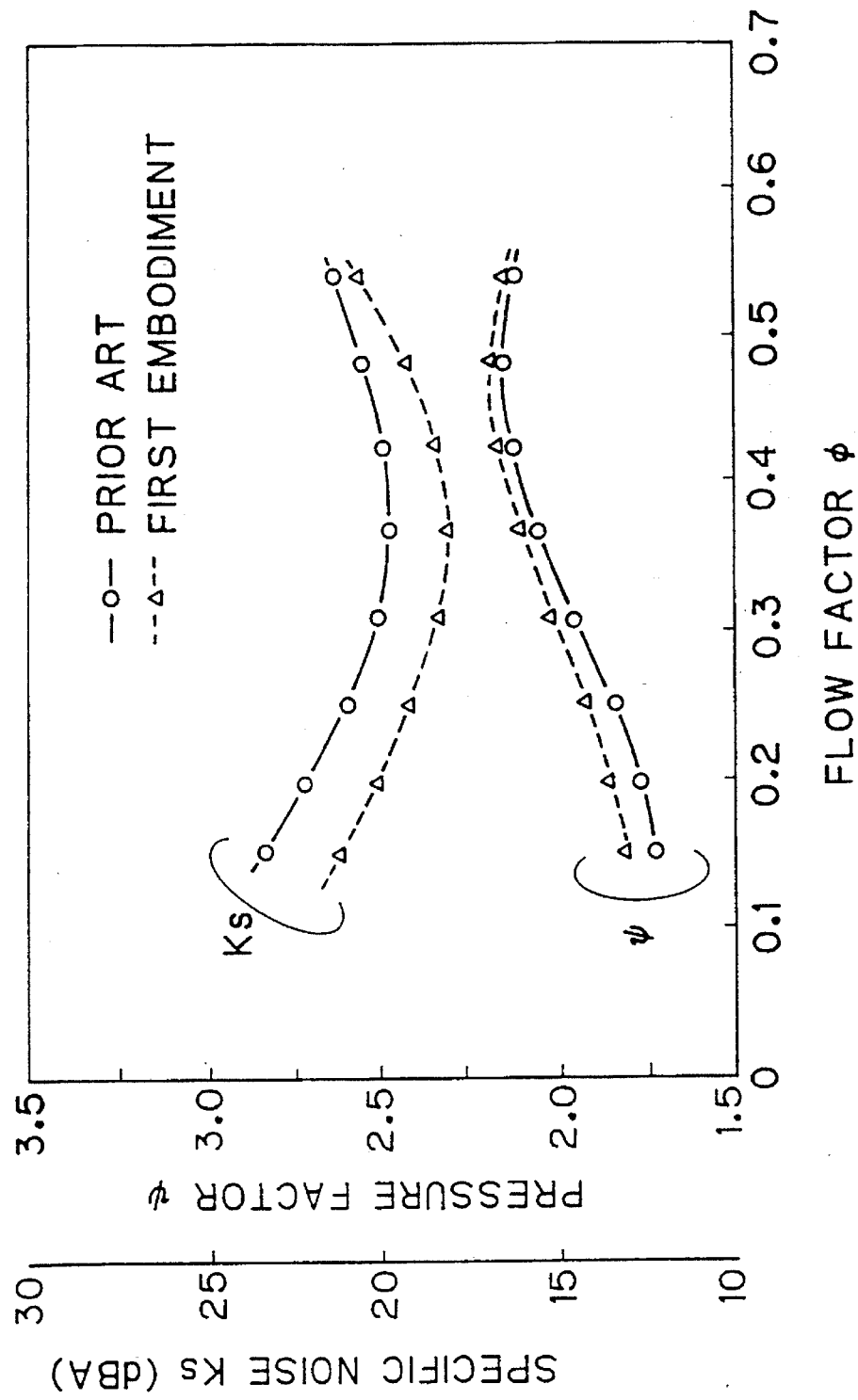
FIG. 4 shows the relationship between a flow factor and a specific noise and pressure factor in the first embodiment, in comparison with the prior art.

Result of tests conducted by the inventors will now be shown with reference to the embodiment in FIG. 3, where the outer diameter of the fan 20 is 150 mm, the axial length of the fan 20 was 85 mm, the angle of the spread of the scroll was 5.5°, the voltage of an electric current applied to the blower motor 33 was a constant 12 volts, and the ratio of the gap δ between the shroud and the casing to the outer diameter of the fan is 0.02. In FIG. 4, an abscissa indicates a flow factor Φ, and an ordinate indicates a specific noise $K_s$ as well as a pressure factor ψ. In FIG. 4, dotted lines show the results of the present invention (first embodiment in FIG. 3), and solid lines show the result of the prior art, as shown in FIG. 1(a). The results in FIG. 4 show that, over the prior art, the present invention can reduce the noise and increase the pressure factor $K_S$.

Figure 5:
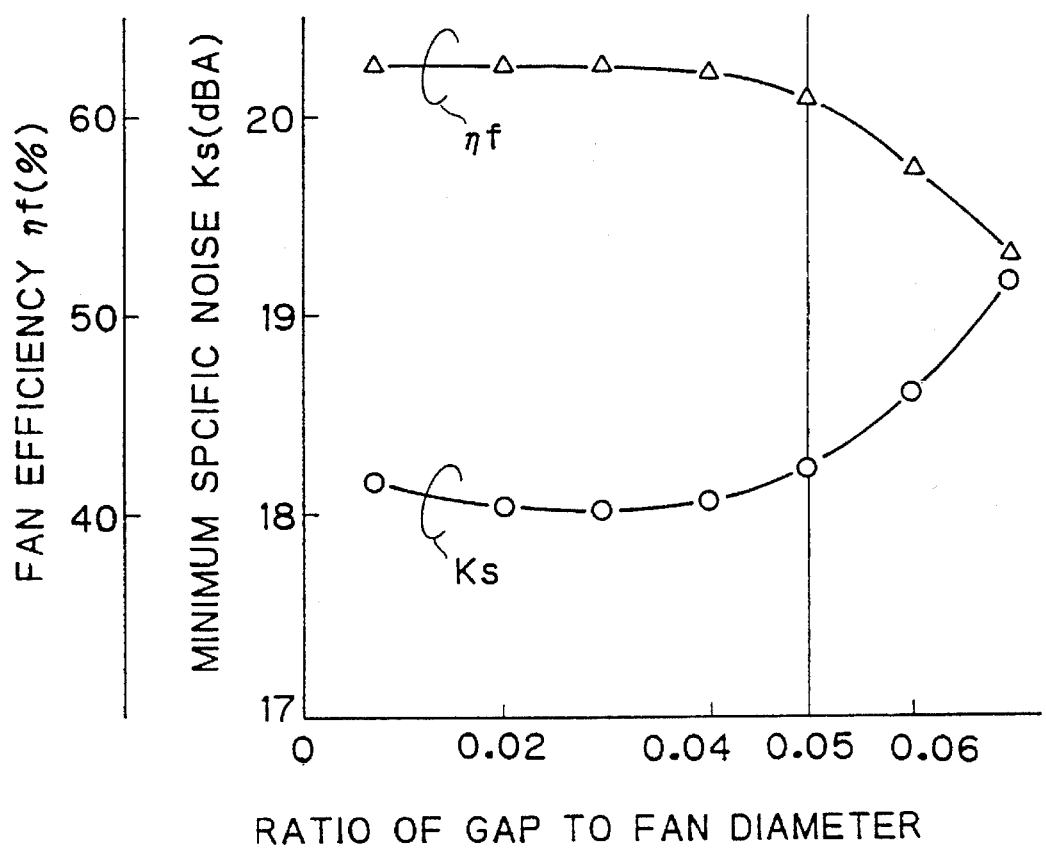
FIG. 5 shows the relationship between a gap-to-fan diameter ratio and fan efficiency and minimum specific noise.

In FIG. 5, abscissa is a ratio of the gap δ to the fan diameter, and an ordinate is fan efficiency $η_F$ and the minimum specific noise $K_S$ as the minimum value of $K_S$ upon a change in the flow factor Φ. As can be seen from FIG. 5, a value of the ratio of the gap to the fan diameter smaller than a value of about 0.05 results in significantly reduced value of the minimum specific noise $K_S$.

Figure 6:
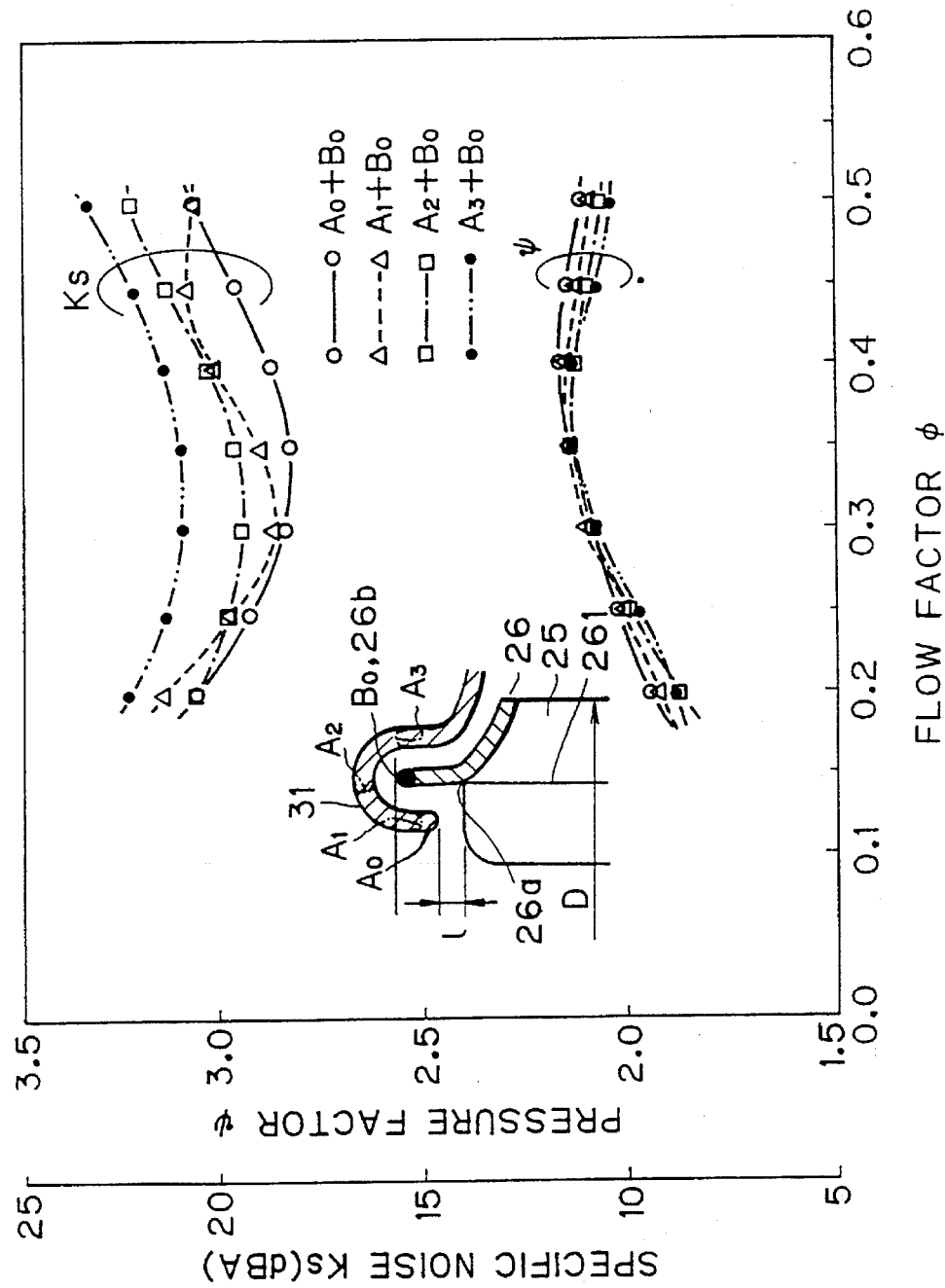
FIG. 6 shows the relationship between a flow factor and specific noise and a pressure factor with respect to various positions of the inner edge of the bell shaped mouth of the shroud.

According to the first embodiment in FIG. 3, a test is also done so as to obtain an effect of the position of the inner edge of the bell mouth 31 of the casing 21 with respect to the outer edge of the shroud 26 by providing samples of various positions of the inner edge of the bell mouth with respect to the outside edge of the shroud 26. Namely, in FIG. 6, according to the first sample, the inner edge of the bell mouth 31 extends until it locates a position $A_0$, where a ratio of the spacing 1 between the inner edge of the casing and the blade 25 to the outer diameter D of the fan 1-D ratio) is 0.02. In the second sample, the inner edge of the bell mouth 31 extends up to a position as shown by $A_1$, where the value of the 1-D ratio is 0.04. Actual values of the spacing 1 for the first and second samples were 3 mm and 6 mm, respectively. In the case of the third sample, the inner edge of the bell mouth portion 31 extends up to a position designated by $A_2$, where the inner edge of the bell mouth 31 is in a common plane similar to that of the inner end surface 261 of the shroud 26. For the fourth sample, the inner edge of the casing terminates at a location $A_3$, where no bell mouth portion is created, so that the inner edge extends only axially so as to obtain the same axial end position as the axial end portion $B_0$ of the shroud 26. In FIG. 6, an abscissa is a flow factor φ, an ordinate is specific noise $K_S$ and pressure factor ψ. With respect to various combinations of positions of the inner edge $A_0$, $A_1$, $A_2$, and $A_3$, and $B_0$, relationships between the flow factor φ and specific noise $K_S$ and between the flow factor φ and the pressure factor ψ are shown. As will be easily seen, the least amount of noise occurs when the position of the edge of the top wall of the casing is $A_0$. Thus, the best position for the inner edge of the bell shaped mouth is such that the spacing of the edge with respect to the blade is as small as possible, so that a smooth flow of air is obtained between the faced walls of the shroud and the casing, thereby reducing the operational noise.

Figure 7:
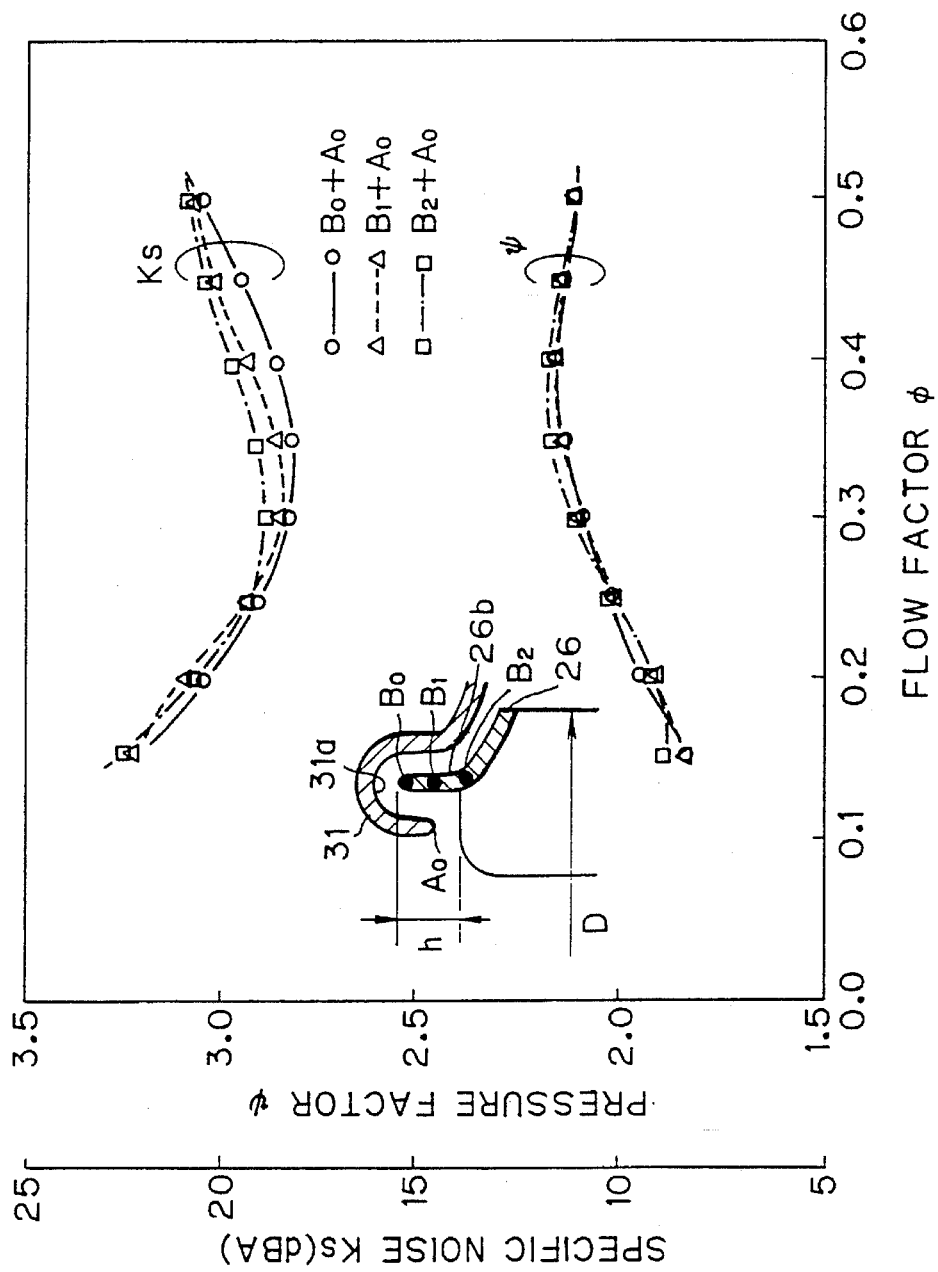
FIG. 7 shows the relationship between a flow factor and specific noise and a pressure factor with respect to various positions of the top edge of the shroud.

Now, the effect of the position of the top edge of the shroud with respect to the bell mouth portion 31 will be discussed. In FIG. 7, three different positions $B_0$, $B_1$ and $B_2$ of the top edge of the shroud are obtained. Namely, for the positions $B_0$, $B_1$ and $B_2$, the ratio of the their height h to the outer diameter D of the fan 20 were 0.06, 0.03 and 0.0, respectively. Namely, for the positions $B_0$, $B_1$ and $B_2$, the value of the height h were 9 mm, 4.5 mm and 0.0 mm, respectively. In FIG. 7, the position of the inner edge of the bell mouth portion 31 was $A_0$, which has already been explained with reference to FIG. 6. In FIG. 7, an abscissa is flow factor φ, an ordinate is specific noise $K_S$ and pressure factor ψ. With respect to various combinations of positions of the inner edge $A_0$, and $B_0$, $B_1$ and $B_2$, relationships between the flow factor ψ and specific noise $K_S$ and between the flow factor ψ and the pressure factor ψ are shown. As will be easily seen, the least amount of noise occurs when the position of the edge of the shroud portion is $B_0$. Thus, the best position for the inner edge of the bell shaped mouth is such that the spacing of the edge 26B of the shroud 26, with respect to the faced inner surface of the bell mouth portion 31, is as small as possible, so that a reverse flow of air is effectively prevented from occurring, which effectively reduces the operational noise. It should be noted that the result of the test in FIGS. 4 and 5 are obtained when the position of the outer edge of the bell mouth is $A_0$ and the position of the axial edge of the shroud is $B_0$.

Figure 8:
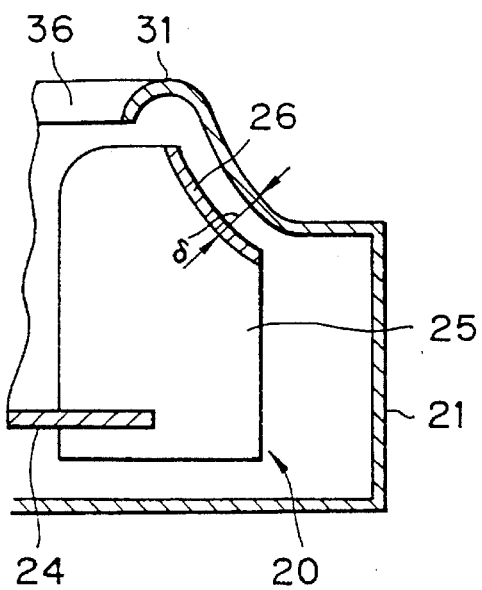
FIGS. 8 to 13 are similar to FIG. 3, but illustrate various other embodiments of the present invention, respectively.

In a second embodiment in FIG. 8, the shroud 26 extends only to the upper edge of the blades 25, so that no axial projection 26b, as is the case in the previous embodiment is provided. As a result, a constant radial gap δ is created between the shroud 26 and the top wall of the casing 21.

Figure 9:
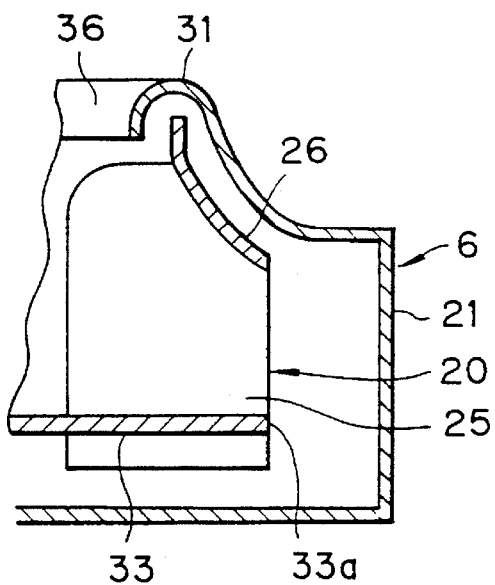

In a third embodiment in FIG. 9, the bottom plate 33 of the fan 20 extends up to the outer radius of the blades 25. Namely, the bottom plate 33 and the shroud 26 have the same value as the outer radius. In this case, the bottom plate 33 and the blades 25 are made as one piece, and the shroud is connected to the blade at a later stage.

Figure 10:
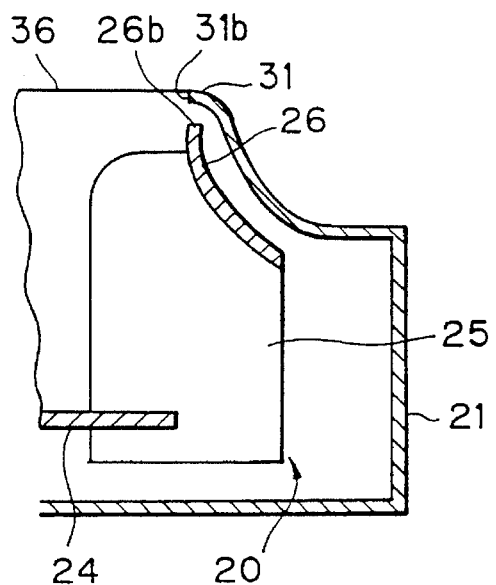

In a fourth embodiment in FIG. 10, the bell mouth inwardly extends only to a position 31b corresponding to the top edge 26b of the axial inner projection of the shroud 26. This construction can provide a large area of the inlet opening 36 of the casing, thereby increasing the amount of intake air.

Figure 11:
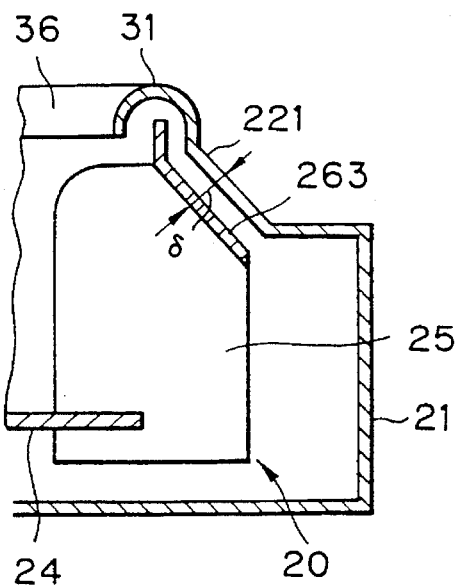

In a fifth embodiment in FIG. 11, the portion 263 of the shroud 26 connected to the top edge of the blades 25 is formed as a conical shape defining a radially, downwardly inclined straight line in its cross section. The casing 21 has a conical shaped portion 221 faced with the conical shaped portion 263 of the shroud so that a substantially constant gap δ is created between the faced conical walls of the shroud and the casing 21.

Figure 12:
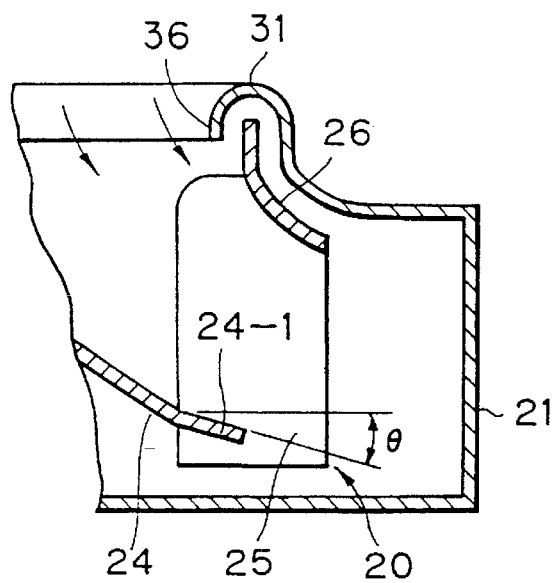

In a 6th embodiment in FIG. 12, the fan is provided with a bottom plate 24 having an outer peripheral portion 24-1 extending downwardly and inclining under an angle θ with respect to the horizontal plane. The air flows, as shown by arrows are, when passed through the blades 25, guided by the portion 24-1, thereby reducing turbulence. Thus, provision of this shape of the bottom plate 24 in combination with the bell mouth shaped inner edge 31 can effectively reduce operational noise.

In the 7th embodiment in FIG. 13, the bottom wall of the casing 21 is constructed by a flat, central plate portion 52 located just below the fan 20, an intermediate annular portion 54 having a conical shape and defining, in cross-section, a straight line inclined downwardly in the radially outer direction at an angle $θ_S$, and an annular outer flat portion 53 extending from the intermediate conical portion 54. The outer flat portion 53 is connected to the tubular side wall portion of the casing 21. Such a casing construction 21 can provide a scroll shaped air passageway of which the cross section increases gradually as it moves toward the outlet of the passageway.

Figure 13:
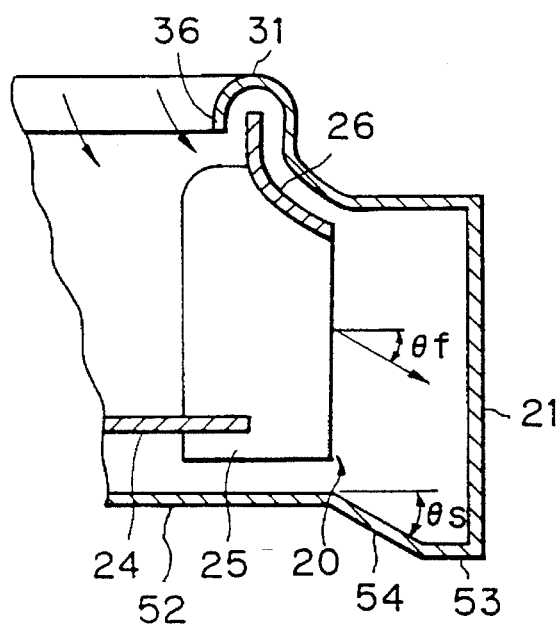

In the 7th embodiment in FIG. 13, a relationship between the inclination angle $θ_S$ of the portion 54 and the inclination angle of the air $θ_f$ as issued from the blades 25 is shown.

Figure 14:
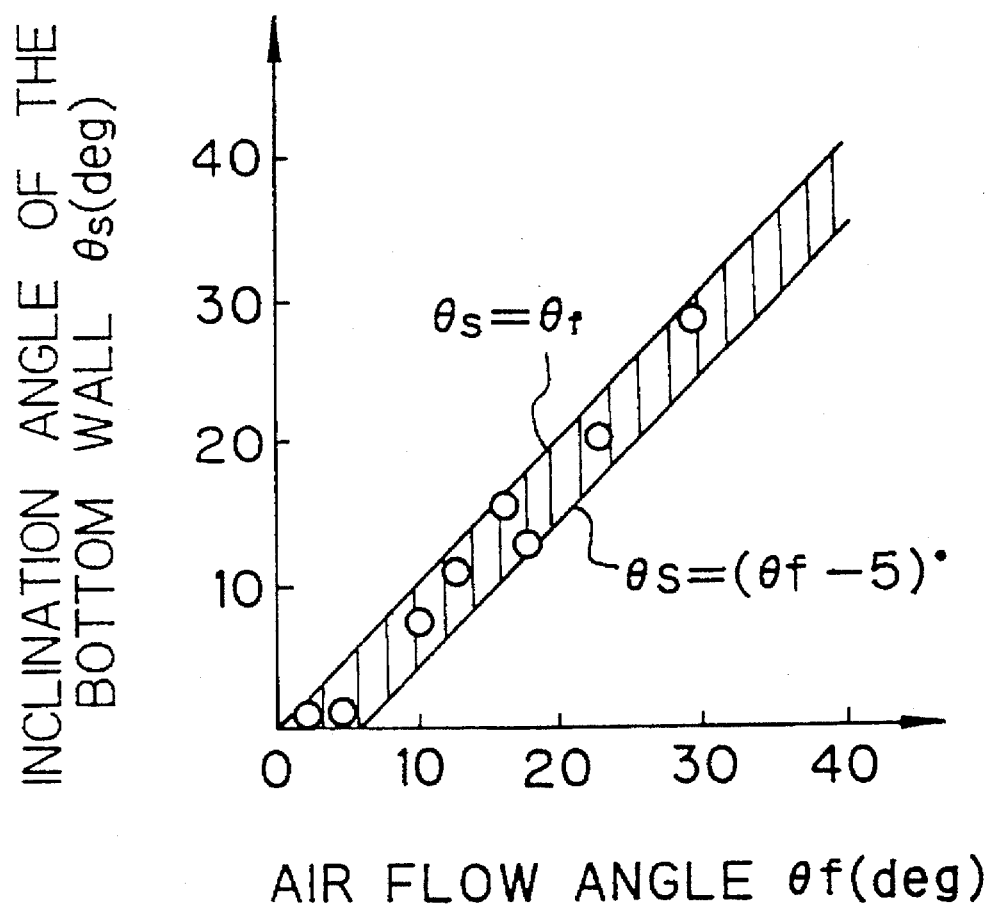
FIG. 14 is a relationship between the flow angle and the angle of the portion of the bottom wall in FIG. 13.

Namely, in FIG. 14, an abscissa is the inclination angle $\theta_S$ of the plate portion 54 and an ordinate is the inclination angle $\theta_f$ of the air flow. In FIG. 14, an optimum inclination angle $\theta_S$ is such that it provides the smallest value of the minimum specific noise $k_S$. It should be noted that the fan efficiency $\eta_f$ has such a relationship with respect to the minimum specific noise $k_S$ that the smaller the minimum specific noise $k_S$, the higher the fan efficiency $\eta_f$. As a result, the optimum inclination angle $\theta_S$ can be determined in accordance with the fan efficiency value $\eta_f$.

According to the test in FIG. 14, various fans having different air flow inclination angle values $\theta_f$ are provided, and tests have been done on the fans. In FIG. 14, the desired range of inclination angle $\theta_S$ is in a range, as shown by shaded lines, which is between a straight line expressed by an equation $\theta_S=\theta_f(°)$ and a straight line expressed by an equation $\theta_S=\theta_f-5(°)$.

Figure 15:
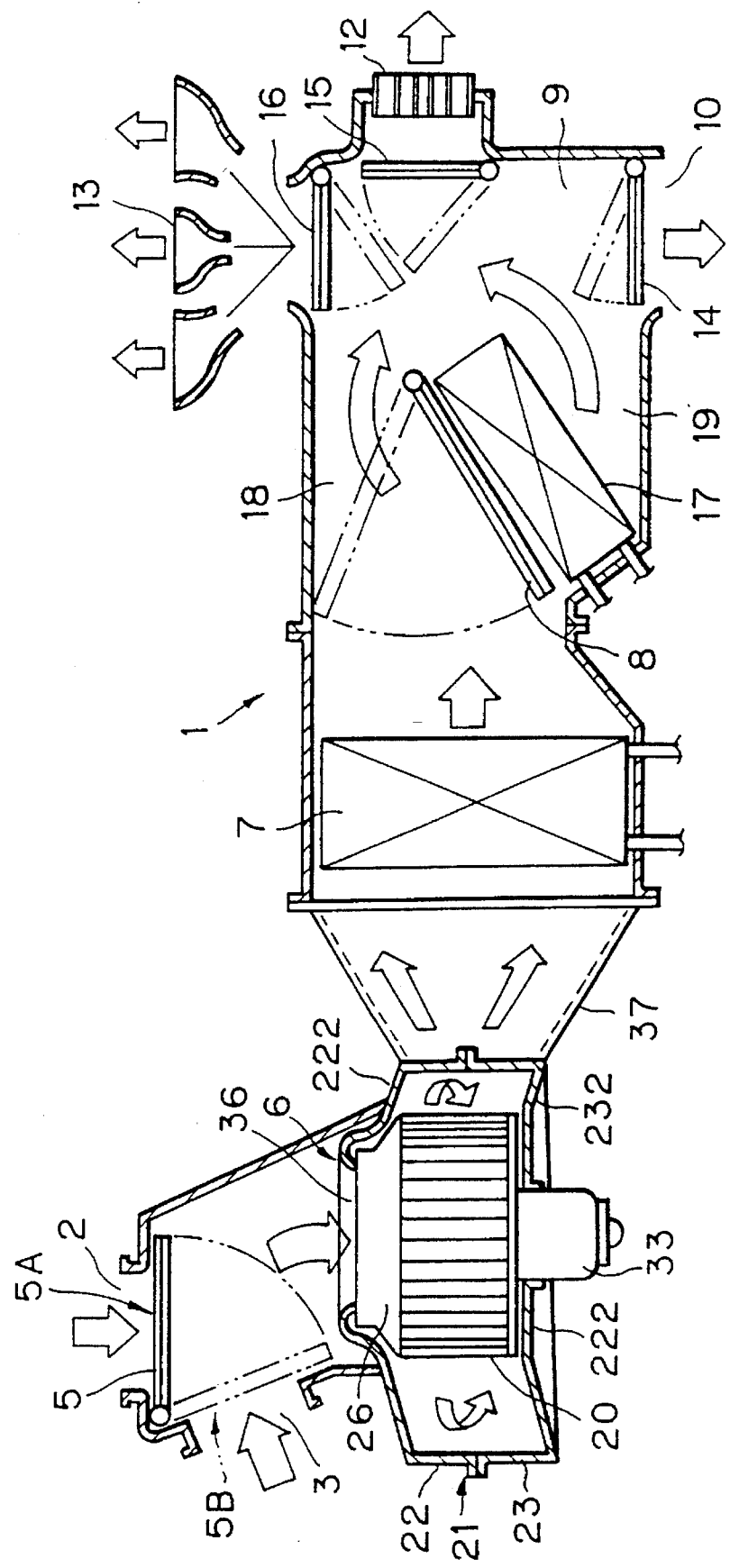
FIG. 15 is similar to FIG. 2A but shows a different embodiment, where a top and bottom wall of the fan casing are inclined.

FIG. 15 is similar to FIG. 2A but directed to an 8th embodiment of the present invention. This 8th embodiment in FIG. 15 differs in that, in place of the top and bottom wall of the casing extending in a plane transverse to the axis of the rotation of the fan 20, the top and bottom wall of the casings have radially outer portions 222 and 232 that are inclined downwardly. Construction other than this point is the same as that in FIG. 2A, and therefore, a detailed explanation thereof will be omitted using the same reference numeral for parts functioning in a similar way.

FIG. 16 shows a detailed construction of the fan assembly in the 8th embodiment, which is constructed, basically, by the centrifugal fan 20 and the casing 21. The casing 21 is constructed by an upper part 22 and a lower part 23, which are made as a mold from a certain plastic resin material. The upper and lower parts 22 and 23 are formed with faced flange sections 22-1 and 23-1, which are connected to each other by a suitable means, such as clamps or bolts and nuts.

As shown in FIG. 16, the fan 20 is constructed by a bottom plate 24 having a central boss portion 28, a plurality of blades 25, each extending axially from the bottom plate 24 while forming a curved plate inclined with respect to the direction of the rotation of the fan 20, and a shroud 26 as a strengthening ring plate connected to the ends of the blades 25. Connected to the boss portion 28 of the fan 20 is a rotating shaft (not shown) of the fan 20 for imparting a rotational movement from the shaft of a motor 33 (FIG. 15) to the fan 20. It should be noted that, as shown in FIG. 16, the bottom plate 24 is convexed axially upward from the outer peripheral portion to the center portion. The blades 25 are connected to the outer peripheral portion 242 (FIG. 16) of the bottom plate 24 of the fan 20. These blades are arranged along the circumference of the outer periphery 242 of the bottom plate 24 so that they are spaced equiangularly. As shown in FIG. 16, the shroud member 26 has an inner annular axially projected portion 262, which is located on the same radius as that of the outer periphery of the bottom plate 24, so that a division line 30 for a mold is created. It should be noted that the shroud form, on the outer side thereof spaced from the blade portion 25, has an annular top curved surface with a substantially arc shaped cross section.

The casing 22, in which the fan assembly 22 is stored, forms an inner circular edge 31, inwardly of which the axial inlet 36 for the air to be drawn is created. The inner circular edges 31 form, along its cross section, a bell mouth shaped portion defining an annular recess, to which the tubular projection 262 of the shroud 26 extends, so that a gap of a spacing $\delta$ of a value of about 3 mm is created between the faced surfaces of the shroud 26 and the inner wall 311 of the bell mouth portion 21 of the casing 22. Such an annular gap of about 3 mm with respect to the casing 22 extends along the entire radial extension of the curved upper surface 263 of the shroud 26; namely from the top end of the axial projection 262 to the outer peripheral end 264.

As shown in FIG. 16, the casing 22 has a top wall 222 extending along the shroud 26 of the fan 20 while maintaining a small spacing therebetween. Furthermore, the top wall 222 is downwardly inclined as it is located radially outward, so that an angle $\theta_1$ is created between the horizontal plane that is transverse to the axis of rotation of the fan and the upper wall 222 of the casing 22.

The lower casing 23 has a central part 231 extending horizontally up to a location corresponding to the outer diameter of the blades 25, i.e., the outer edge 264 of the shroud 26, and a peripheral part 232 located outside of the central part 231; part 232 extends up to a lower edge 234 of the lower casing 23, while inclining downwardly under an angle $\theta_2$ with respect to the horizontal plane. In other words, the upper surface 222 and the lower surface 232 of the casing are both inclined downwardly at the angle $\theta_1$ and $\theta_2$, respectively, in the same direction as they are located radially outward.

The casing according to the 8the embodiment is constructed by the upper and lower casings 22 and 23 having tubular walls 223 and 233, which construct a tubular outer wall when they are connected to each other via the flanges 22-1 and 23-1.

According to the 8th embodiment in FIG. 16, similar to the first embodiment in FIG. 3, a shroud 26 at the top of the blades 25 extends along the direction of the air flows 48 as drawn from the inlet opening 36 while the upper wall 222 of the casing of the constant spacing of $\delta$, with respect to the shroud 26, extends along the same direction for a distance longer than the extension of the shroud. Such a construction very effectively prevents reverse flows in the prior art.

According to the inventor's test, in the prior art shown in FIG. 1(a) of (b), a portion of the bottom wall 212 of the casing extending outwardly of the fan 20 causes the air flows 49 to come into contact with said portion 212, thereby causing turbulence in the air flows. According to the 8th embodiment in FIG. 16, the bottom wall of the casing has an outer portion 232 outside the diameter of the fan 20, which is inclined downwardly with respect to the horizontal wall at an angle $\theta_2$, similar to the top wall 222 of the casing 21. As a result, the air flows from the blades 25 are prevented from colliding with the bottom wall portion 232, thereby reducing operational noise, with the construction according to the present invention.

Figure 17:
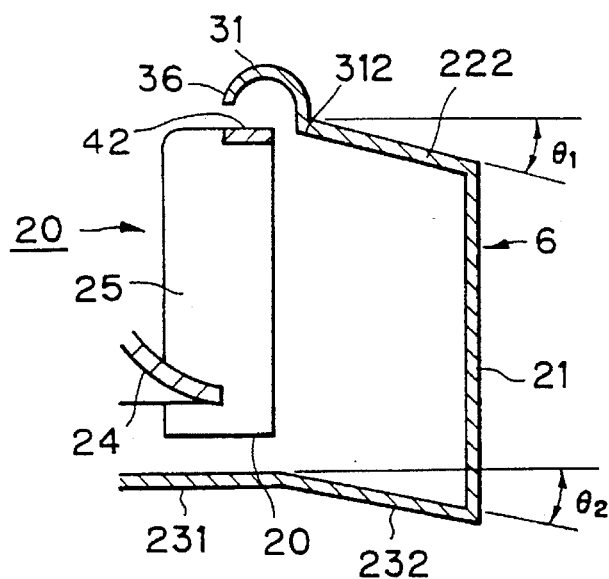
FIGS. 17 and 18 are similar to FIG. 16, but show different embodiments of the invention, respectively.

FIG. 17 shows a partial view of a 9th embodiment, wherein a centrifugal fan device includes a normal type of fan 20 with no shroud that is similar to the fan in the prior art shown in FIG. 1(b), this normal type of fan with no shroud is arranged in the casing 21 having a pair of opposite top and bottom walls 222 and 232 having the same construction as shown in FIG. 16 in the 8th embodiment, which are both inclined downwardly outward with respect to the horizontal plane as they are located radially. Namely, the fan 20 in the 9th embodiment in FIG. 17 is provided with a plurality of circumferentially spaced blades 25 having a rectangular shape connected at their top end by means of a ring shaped retainer ring 42. In this 9th embodiment, the upper wall of the casing 21 has an inner mouth 31 formed as an inwardly opened bell shape having a semi-circular shape. Extending radially outward from the mouth 31 is a top wall portion 222 that is inclined, with respect to a horizontal plane, at an angle $\theta_1$. Similar to the 8th embodiment, the casing in the 9th embodiment in FIG. 17 has a bottom wall having a center portion 231 extending horizontally up to a diameter corresponding to the diameter of the fan 20 and a radially outward portion 232 extending from the central portion 231 at an angle $\theta_2$ with respect to the horizontal plane.

A 10th embodiment of the present invention is described with reference to FIG. 18 together with a perspective view of the centrifugal fan in FIG. 19. This embodiment is modified, with respect to the 9th embodiment in FIG. 17, in that the upper wall 222 of the casing inclined downwardly, with respect to the horizontal plane at an angle $\theta_1$, extends smoothly to the edge portion 31 of an arc shaped cross section. Similar to the 9th embodiment in FIG. 17, the casing 21 has a bottom outer portion 232 extending from the outer diameter of the blades 25, which is inclined downwardly with respect to the horizontal plane at an angle $\theta_2$.

Figure 18:
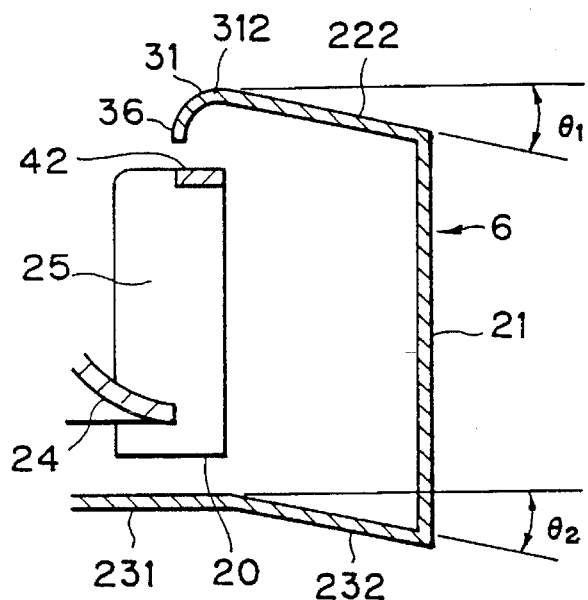
Figure 19:
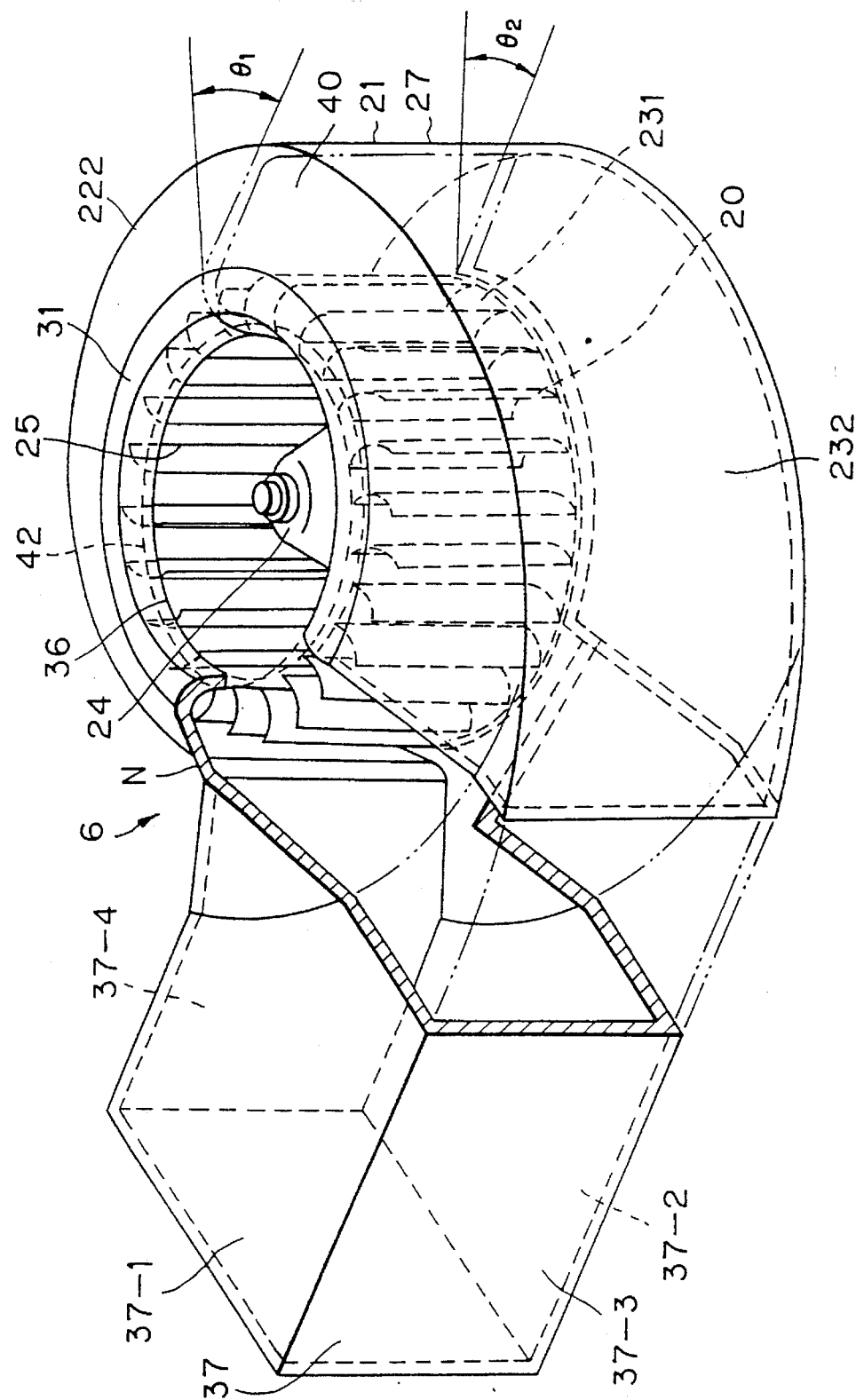
FIG. 19 is a perspective view of a fan device of 10th embodiment in FIG. 18.

FIG. 19 shows, in a perspective view, a scroll shaped casing 21, for the 10th embodiment in FIG. 18. The fan casing 21 is formed as a scroll having a tubular body portion in which the fan assembly 20 is rotatably stored, and which has an axis of elongation that is parallel to the axis of the rotation of the fan assembly 20, and a outlet duct portion 37 extending tangentially from the tubular body portion. The fan assembly 20 is constructed of a bottom plate 24, a plurality of circumferentially spaced blades 25 fixedly connected to the outer periphery of the bottom plate, and a retainer ring connected to the top ends of the blades 25. The tubular body portion has a top wall 222 having an inlet 36 axially opened to the fan assembly 20, a bottom wall 232 that is axially spaced from the top wall 222, and a tubular side wall connecting the top and bottom walls 222 and 232 to each other. The outlet duct 37 forms a rectangular cross sectional shape having a top wall 37-1 extending from the top wall 222 of the tubular portion, a bottom wall 37-2 extending from the bottom wall 232 of the tubular portion, and side walls 37-3 and 37-4 extending from the tubular walls of the tubular portion 27. The fan assembly 20 is stored in the casing 21 so that a space 40 commencing from a nose point N having an increased radial dimension is created along the direction of the rotation of the fan assembly; the space of which is connected to the outlet duct 37. Such a space having an increased radial dimension can receive a desired amount of air induced by the fan, which increases circumferentially from the nose point N. The rotation of the fan assembly 20 causes the air to be drawn via the inlet opening 36, and the drawn air is directed radially outward via the blades into a space inside the casing 21 radially outward from the fan assembly 20, and is directed to the outlet duct 37. As is also explained with reference to FIG. 18, the top wall 222 in FIG. 19 has an inner annular edge 31 for defining the inlet opening 36 from which it is inclined downwardly at an angle $\theta_1$, with respect to the horizontal plane. The bottom wall 232 has an outer peripheral portion extending from a position of the radius of the fan assembly, the portion of which is inclined downwardly at an angle of $\theta_2$ with respect to the horizontal plane.

Figure 20:
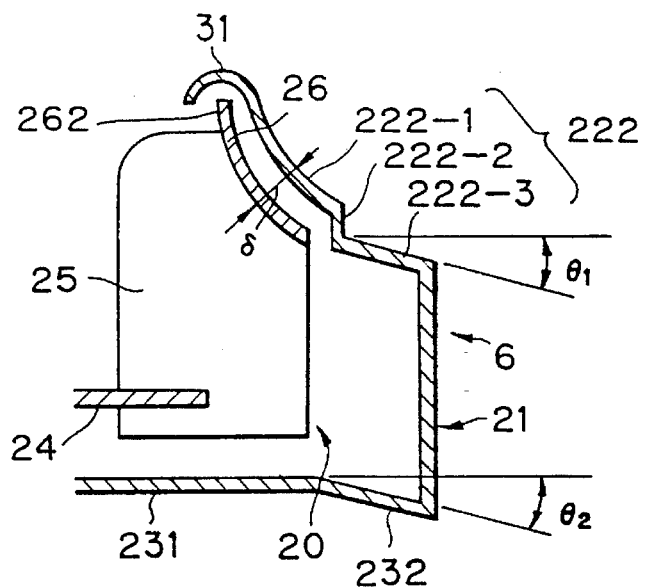
FIGS. 20 and 21 are similar to FIG. 16, but show different embodiments of the invention, respectively.

FIG. 20 shows a 11the embodiment, which is similar to the 8th embodiment in FIG. 16, except that the ring shaped shroud 26 has an inner top portion 262 extending smoothly from the remaining portion adjoining the blades 25 so that the top portion is slightly radially and downwardly inclined with respect to the axis of the rotation of the fan 20, and except that the upper wall 222 of the casing 21 is formed with a curved (inner) portion 222-1 extending outwardly from the edge portion 31 along the shroud 26 of the fan assembly 20 so that a gap having a constant width $\delta$ is created between the faced surfaces of the shroud and the top wall, a bent (middle) portion 222-2 extending vertically downward to a location corresponding to the outer diameter of the blades 25 at their radial outermost end, and a peripheral (outer) portion 222-3 bent from the middle portion 222-2 and extending downwardly so as to form an angle $\theta_1$ with respect to the horizontal plane. As similar to the previous embodiments (8th to 10th embodiments), the casing 21 has a bottom wall having an outer portion 232 located radially outward from the outer diameter of the blades 25; the portion 232 of which extends downwardly so as to form an angle $\theta_2$ with respect to the horizontal plane.

Figure 21:
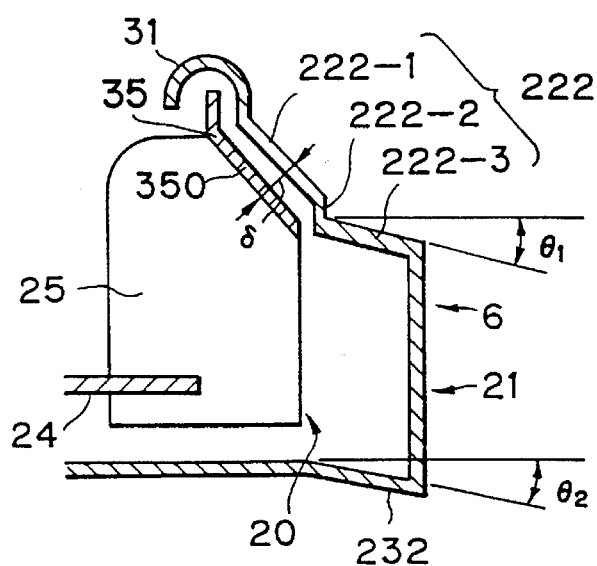

FIG. 21 shows a 12th embodiment where a shroud 35 is formed with an annular base portion 350 contacting the top edges of the blades 25, and the portion 350 extends radially downward to form, along the longitudinal cross section, a straight line in place of the curved line in previous embodiments. In the 12th embodiment in FIG. 21, the casing has a top wall defining an inner edge portion 31 defining a bell shaped cross section, an inner portion 222-1 extending radially while inclining downwardly, and the inner portion 222-1 forming along its cross section a straight line so that a substantially constant gap of $\delta$ is created between the faced surfaces of the portions 350 of the shroud 35 and the portion 222-2 of the top wall of the casing 21. Similar to the 11th embodiment in FIG. 20, a provision is also made for a bent (middle) portion 222-2 extending vertically downward to a location corresponding to the outer diameter of the blades 25 at their radial outermost end, and a peripheral (outer) portion 222-3 bent from the middle portion 222-2 and extending downwardly so as to form an angle $\theta_1$ with respect to the horizontal plane. Similar to the previous embodiments (8th to 11th embodiments), the casing 21 has a bottom wall having an outer portion 232 located radially outward from the outer diameter of the blades 25; the portion 232 of which extends downwardly so as to form an angle $\theta_2$ with respect to the horizontal plane.

Figure 22:
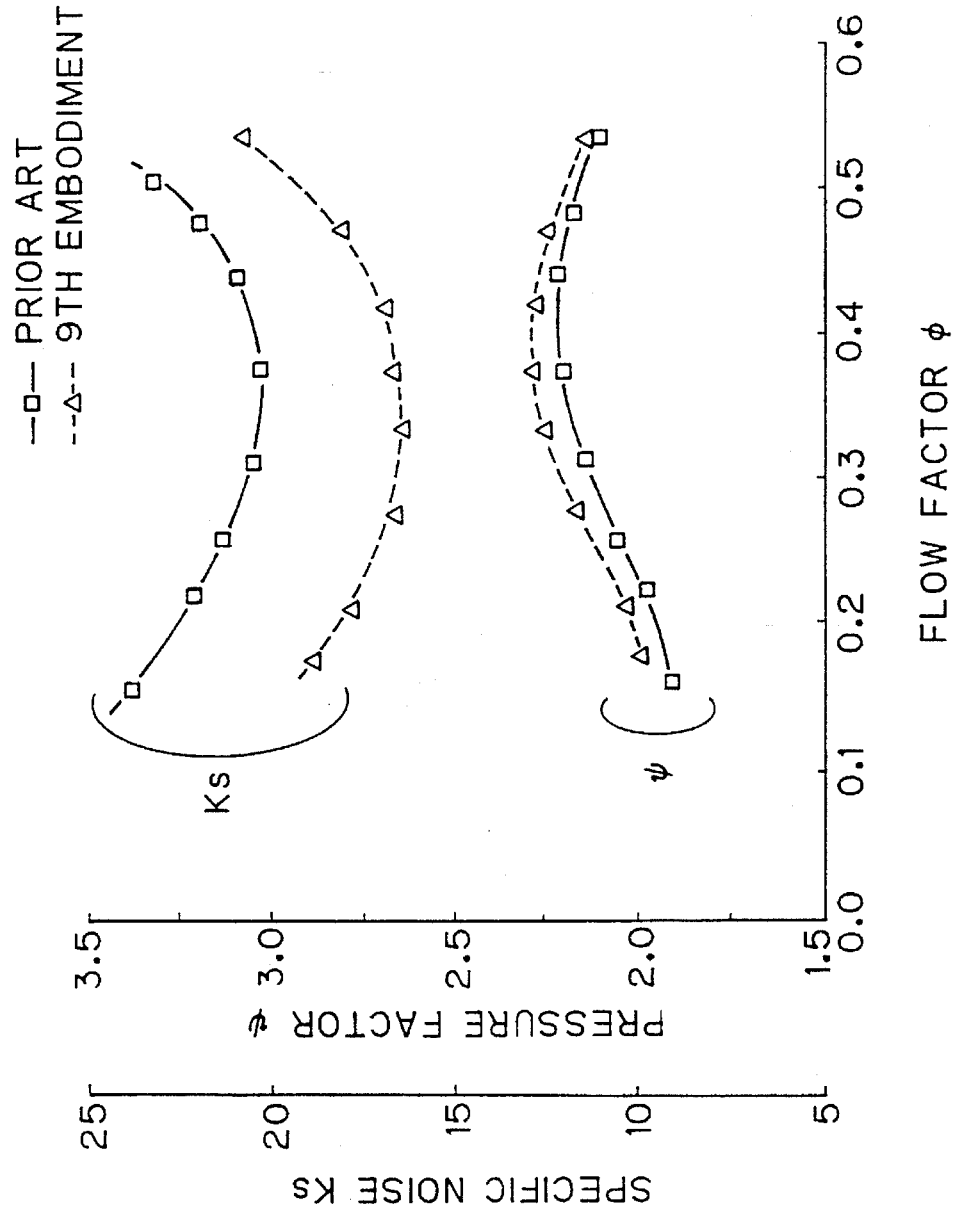
FIG. 22 shows the relationship between a flow factor and specific noise and a pressure factor in the embodiment in FIG. 17.

Results of tests conducted by he inventors will now be shown with reference to the 9th embodiment in FIG. 17, where the outer diameter of the fan 20 is 150 mm, the axial length of the fan 20 is 85 mm, the angle of the spread of the scroll is 5.0°, the voltage of an electric current applied to the blower motor 33 is a constant 12 volts, and the values of the angles $\theta_1$ and $\theta_2$ of the inclination of the top and bottom wall portions 222 and 232 are both, 10°. In FIG. 22, an abscissa indicates an flow factor $\Phi$, and an ordinate indicates a specific noise $K_S$ as well as a pressure factor $\psi$. In FIG. 22, dotted lines show the results of the present invention, and solid lines show the results of the prior art, as shown in FIG. 1(b). The results in FIG. 22 show that, over the prior art, the 9th embodiment in FIG. 17 can reduce the noise up to 3 to 4 dB and increase the pressure factor $K_S$.

Figure 23:
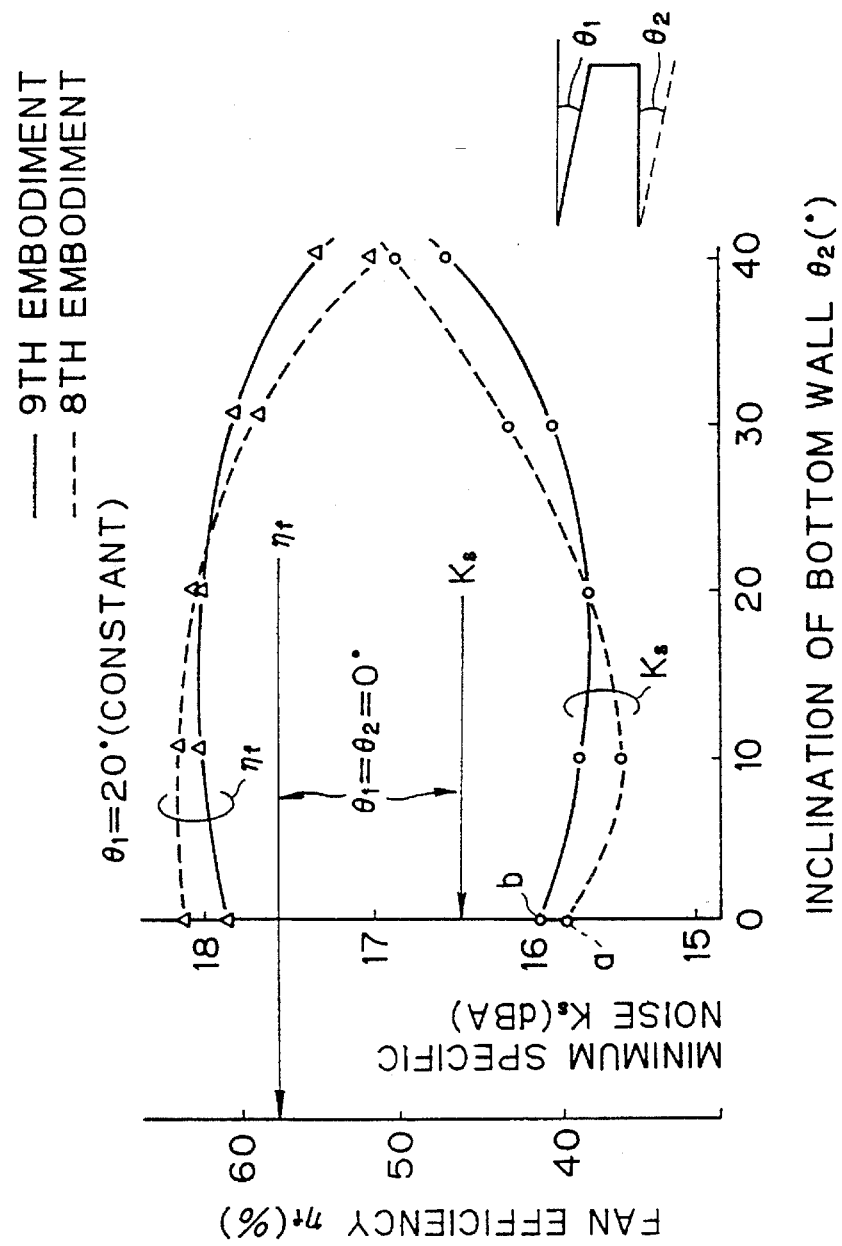
FIG. 23 shows the relationship between the inclination angle of the bottom wall and fan efficiency and the minimum specific noise with respect to the embodiment in FIGS. 16 and 17.
Figure 24:
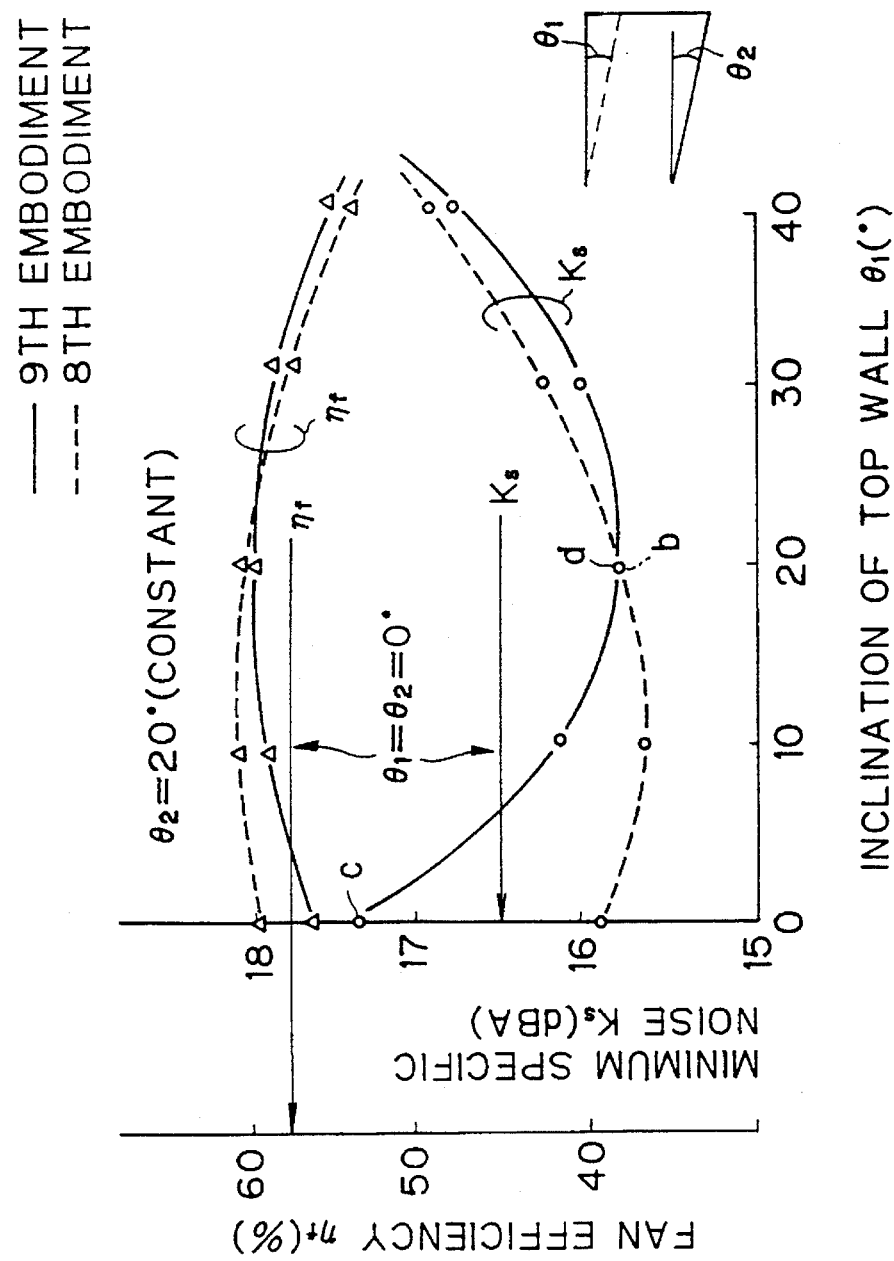
FIG. 24 shows the relationship between the inclination angle of the top wall and fan efficiency and the minimum specific noise with respect to the embodiment in FIGS. 16 and 17.

A test was also done to check the effect of the values of the inclination angles $\theta$ and $\theta_2$ over the minimum specific noise $K_S$ and a fan efficiency $\eta_f$. The test was done under the same conditions as mentioned above with reference to the test shown by FIG. 22. Note, the minimum specific denotes the value of the specific noise that provides the minimum value of the specific noise when the value of the flow factor $\phi$ is varied. In FIG. 23, an abscissa is the inclination $\theta_2$ of the outer portion 232 of the bottom wall of the casing 21, and an ordinate is the minimum specific noise as well as the fan efficiency $\eta_f$. The result in FIG. 23 was obtained when the value of the $\theta_1$ is maintained to 20°. In FIG. 24, an abscissa is the inclination $\theta_1$ of the portion 222 of the top wall of the casing 21, and an ordinate is the minimum specific noise as well as the fan efficiency $\eta_f$. The result in FIG. 24 is obtained when the value of the $\theta_2$ is maintained to 20°. In FIGS. 23 and 24, solid lines denote the results of the 9th embodiment in FIG. 17 of the present invention, while the dotted line shows the results of the 8th embodiment in FIG. 16. It is clear from the results in FIG. 22 that the minimum value of the specific noise level $K_S$ is about 20 dB for the construction of the fan device in the prior art shown in FIG. 1(b). On the other hand, as can be seen from the results in FIGS. 23 and 24, a minimum specific noise $K_s$ of a value about 15.8 dB (point a) is obtained when the upper surface inclination angle $\theta_1=20°$ and lower surface inclination angle $\theta_2$ is 0° for the 8th embodiment (FIG. 16), as shown by the dotted lines, which means that the construction of the 8th embodiment of the present invention in FIG. 16 can reduce the noise level of about 4.2 dB even with a construction in that only the top wall 222 is inclined with respect to the horizontal plane, while the lower plate 232 remains horizontal when compared with the construction of the prior art in FIG. 1(b). Similarly, for the 9th embodiment (FIG. 17) as shown by the solid lines in FIGS. 23 and 24, a minimum specific noise $K_S$ of a value about 16.0 dB (point b) is obtained when the upper surface inclination angle $\theta_1=0°$ and lower surface inclination angle $\theta_2=20°$ for the 8th embodiment (FIG. 16), as shown by the dotted lines. For the 9th embodiment in FIG. 17, a reduction in the noise level of about 4.0 dB can be obtained, compared to the construction in the prior art in FIG. 1(b).

In the 9th embodiment (FIG. 17), as shown by the solid lines in FIG. 23, a minimum specific noise $K_S$ when $\theta_1$ and $\theta_1=0°$ is 16.4 dB. This means that the construction of only the upper wall portion 222 as inclined can obtain a reduction of noise level of 0.4 dB over the construction of no inclination.

In addition to the inclination $\theta_1$ at the top wall 222, the provision of the inclination $\theta_2$ at the bottom wall 232 can further effectively reduce the minimum specific noise $K_S$. The desired range of angle $\theta_2$ values for the minimum specific noise is in a range between 5° to 20° for the 8th embodiment, shown by the dotted line in FIG. 23, and between 5° to 30° for the 9th embodiment, shown by the solid line in FIG. 23.

As will be seen from FIG. 24, illustrating the effect of the angle $\theta_1$ of the inclination of the top wall 222 upon a fixed value of the angle $\theta_2$ of the inclination of the bottom wall 232. The desired range of angle $\theta_1$ values for the minimum specific noise is in a range between 5° to 20° for the 8th embodiment, shown by the dotted line in FIG. 24, and between 5° to 40° for the 9th embodiment, shown by the solid line in FIG. 24.

If the fan efficiency $\eta_f$ is focused, as in the 9th embodiment in FIG. 17, when the top and bottom wall inclination angles $\theta_1$ and $\theta_2$ have a value of zero, the value of the fan efficiency $\eta_f$ is raised to about 57%, and when the value of the top wall inclination angle $\theta_1$ is maintained at 20°, as shown in FIG. 23, the 9th embodiment, as shown by the solid line with the bottom wall inclination angle $\theta_2$ value in a range between 0 to 30°, can produce a fan efficiency value $\eta_f$ larger than the 57% value of the fan efficiency $\eta_f$ that is obtained when both the top and bottom wall inclination angles $\theta_1$ and $\theta_2$ are equal to zero. When the bottom wall inclination angle $\theta_2$ is maintained to 20°, as shown in FIG. 24, the 9th embodiment, as shown by the solid line with a top wall inclination angle $\theta_1$ value in a range between 5° to 30°, can produce a fan efficiency value $\eta_f$ larger than the 57% fan efficiency value $\eta_f$ that is obtained when both the top and bottom wall inclination angles $\theta_1$ and $\theta_2$ are equal to zero.

As regards the minimum specific noise $K_S$ and the fan efficiency $\eta_f$, it is preferable that the top wall inclination angle $\theta_1$ be in a range between 5° to 30° while the bottom wall inclination angle $\theta_2$ be in a range between 5° to 40°.

FIG. 25(a) is the same as the 8th embodiment (FIG. 16) but explains a relationship between the angle $\theta_f$ of the air flow issued from the fan 20 and the top or bottom wall angle designated as $\theta_S$ in FIG. 25(a) but corresponding to $\theta_1$ or $\theta_2$ in FIG. 16. The air flow angle $\theta_f$ is measured with respect to the horizontal plane. In FIG. 25(a), where the fan 20 provides a flow of air that forms an angle $\theta_f$ with respect to the horizontal plane, the most suitable inclining angle $\theta_S$ herein referred to is an angle $\theta_1$ or $\theta_2$ of the top plate 222 or the bottom plate 232, with respect to the horizontal plane, which can provide the desired result. This most suitable inclining angle $\theta_S$ is, for example, in the 8th embodiment in FIG. 16 the angle $\theta_2$ of about 10°, which can provide the smallest specific noise value $K_S$, as shown in FIG. 23. Proportional, substantially, to the minimum specific noise $K_S$ is the fan efficiency $\eta_f$, and therefore the most suitable inclination angle $\theta_S$ can be determined in accordance with the value of the fan efficiency value $\eta_f$.

The tests by the inventors were conducted by changing the height h of the blades 25 of the fan to obtain various air discharging angle $\theta_f$ values. In FIG. 25(b), an abscissa is the value of the air discharging angle $\theta_f$, and an ordinate is the value of a suitable inclination angle $\theta_S$. As can be seen from FIG. 25(b), the suitable inclination angle $\theta_S$ is in a range as shown by the shaded lines, which is located between a line $L_1$ expressed by an equation $\theta_S=\theta_f -5$ and a line $L_2$ expressed by an equation $\theta_S=\theta_f$.

FIG. 26 (13th embodiment) is a modification of the 8th embodiment in FIG. 16, where the top and bottom walls of the casing are inclined downwardly in the radially outward direction of the casing. As shown in FIG. 26, the casing 21 is constructed of a top wall, a bottom wall, and a tubular side wall connecting the top and bottom walls. The top wall is constructed of an inner bell shaped portion 31, and an outer ring shaped portion 222 that is inclined downwardly toward the radially outward direction at an angle $\theta_1$. The bottom wall is constructed of a central portion 231 extending horizontally, and an outer portion 232 that is inclined downwardly toward the radially outward direction at an angle $\theta_2$.

FIG. 27 is a schematic side view of the casing shown along a line XXVI in FIG. 26. As explained with reference to FIG. 2B, the casing 21 is formed with a scroll shape having a tubular body portion and a duct portion 37 extending tangentially from the body portion. The fan 20 having an axis $O_1$ of rotation, so that a scroll passageway 40 of a gradually increasing width toward the outlet duct 37, is created in the casing 21 outside of the fan 20. As shown in FIG. 27, the casing forms a nose 220 having a rounded shape at a location where the outlet duct 37 is connected to the tubular body portion. The center of the curvature of the nose portion 220 is designated by $O_2$. A line X for connection of the center $O_1$ of the rotation of the fan 20 with the center $O_2$ of the curvature of the nose 220 is referred to, herein, as a reference line ($\theta=0$). The angle (scroll angle) $\theta$ is defined as an angle of the position of the casing about the center $O_1$ measured from the reference line X. At a location of the casing 21 in a range of the angle $\theta$ between 0° and 45° (line X'), the outer tubular side wall extends parallel along the axis of the rotation of the fan 20, as shown in FIG. 28(a) or (b). In other words, an angle $\alpha$ of the plane of the side wall with respect to the line parallel to the axis of the rotation of the fan is zero degrees. At a location of the casing in a range of the angle $\theta$ between 45° to 270°, the value of the angle $\alpha$ is increased in accordance with an increase in the scroll angle. See FIGS. 28(c), (d) and (e). FIG. 29 shows a relationship between the scroll winding angle and the value of the angle α of the inclination of the side, tubular wall of the casing. At a location of the casing in a range of the angle θ between 270° to 360°, the value of the angle α is maintained to 8°. See FIG. 28, (a) to (e). Such a shape of the outer side, tubular wall of the casing is effective for obtaining a value in the casing in accordance with the air amount therein, which corresponds to the velocity distribution of the radial air flows via the spaces between the blades 25 from the air inlet port 35. FIG. 28 (a) to (e) shows respectively desired values of the side wall angle α when the value of the scroll angle θ is 0°, 45°, 90°, 180° and 270°, respectively. Such an arrangement is advantageous in preventing so-called reverse flows, which otherwise occur when an air flow from the blades contacts the surface 22c of the case 21, elevating flows, which otherwise occur due to the pressure difference between the top and the bottom of the blades 25, and recirculating flows, which otherwise occur at the region adjacent to the air inlet 36. As a result of the elimination of reverse flows, elevating flows and the recirculating flows, turbulence in the air flows in the casing are prevented, noise is reduced, and the efficiency of the fan is increased.

According to the 13th embodiment in FIG. 26, the air as drawn from the inlet opening 36 inwardly of the bell mouth portion 31 is passed between the blades 25, as shown by arrows in FIG. 28(a), in such a manner that the direction of the air flows is gradually changed from an axial direction, to a radial direction, so that the air flows are finally discharged from the blades substantially radially as shown by arrows. The inclination of the side wall at the angle α, with respect to a vertical line, is a predetermined range of scroll winding angle θ values, so that smooth flows of air after passing through the blades are obtained and directed toward the outlet duct 37.

According to the test conducted by the inventor using the spark tracing method, which visualizes a flow rate distribution at the outlet of the blades 25, as shown in FIG. 28, larger the value scroll angle θ, and larger the speed of the air flow at the bottom portion. Namely, when θ is 0°, the velocity distribution at the outlet of the blade is substantially uniform as shown by a line $L_a$. When the scroll angle θ is 45°, the flow speed distribution is as shown by a line $L_b$, so that the speed of the air flows at the bottom level becomes higher than that at the top level. When the scroll angle θ is 90° and 180°, respectively, the air speed at the bottom level is much faster, as shown by line $L_c$ and $L_d$, respectively. Finally, when the scroll angle θ is 270°, the speed distribution at the bottom level is as shown by a line $L_e$, so that the difference in the air velocity at the bottom portion from that at the top portion is large. Thus, it can be concluded that, at a region of scroll angle θ values larger than a predetermined value, such as 90°, a substantial flow of air takes place only at the bottom portion of the blades, while air flow at the top portion of the blades is very small. Thus, the arrangement of the side wall of the casing as inclined at an angle α, the value of which increases in accordance with an increase in the scroll angle θ, can produce a smooth flow of air from the blades into the outlet duct 37, while preventing air flows after passing through the blades from colliding with the upper surface $22_c$ bottom wall of the casing, thereby preventing reflection of the flows, as mentioned with reference to the prior art. Simultaneously, the inclination angle α of the tubular side wall of the casing is increased in accordance with an increase in the change of speed between the bottom and top in velocity distribution, so that the pressure difference between the top and bottom portion of the blades can be reduced. As a result, the occurrence of an elevated flow of air in the casing is prevented, which will otherwise occur due to the existence of the reverse flows and the pressure difference.

A 14th embodiment in FIG. 30 is similar to the 10th embodiment in FIG. 18, but an inclination of the side wall of the casing is provided, similar to the embodiment in FIG. 26.

FIG. 31 shows 15th embodiment that is similar to the 1st embodiment in FIG. 3, but an inclination of the side wall of the casing is provided, similar to the embodiment in FIG. 26.

FIG. 32 is a 16th embodiment that is a modification of the 15th embodiment in FIG. 31 in that the bottom wall of the casing has an outer peripheral portion that is inclined downwardly in a radially outward direction.

We claim:

1. A fan device comprising:

a casing of scroll shape having a tubular body portion having axially spaced first and second end walls and a tubular side wall connecting the first and second ends walls to each other, and a discharge duct connected to the body portion;

the first wall having an opening that is coaxial with respect to the axis of the casing;

a fan assembly arranged in the casing so that a passageway is created in the casing around the fan assembly so that the width of the passageway is gradually increased in a circumferential direction until the passageway is connected to the duct;

said fan assembly being constructed of a base plate rotatably supported by the casing at the second wall, a plurality of blades fixedly connected to the outer periphery of the base plate so that the blades are circumferentially spaced;

at least a portion of each of said first wall and said second wall being inclined downwardly in a radially outward direction; and said tubular side wall being inclined with respect to an axis of rotation of the fan assembly so that a bottom portion of the side wall is spaced further from said axis of the fan assembly than a top portion of the side wall.

2. A fan device according to claim 1, wherein the casing forms a nose portion at a location where the discharge duct is connected to the tubular body portion, a scroll angle being defined from a reference line connecting said axis of rotation with a center of curvature of said nose portion to a position of the casing about said axis of rotation, said inclination of the tubular side wall being measured at an area of the scroll angle larger than a predetermined angle measured from said nose portion.

3. A fan device according to claim 2, wherein the angle of inclination α of the side wall is increased in accordance with an increase in the scroll angle.

4. A fan device comprising:

a casing having a tubular body portion having axially spaced first and second end walls and a tubular side wall connecting the first and second end walls to each other, and a discharge duct connected to the body portion;

the first wall having an opening that is coaxial with respect to the axis of the casing;

a fan assembly arranged in the casing so that a passageway is created in the casing around the fan assembly so that the width of the passageway is gradually increased in the circumferential direction until the passageway is connected to the duct;

said fan assembly being constructed of a base plate rotatably supported by the casing at the second wall, a plurality of blades fixedly connected to the outer periphery of the base plate so that the blades are circumferentially spaced, and an annular shroud connected to the edges of the blades spaced from the base plate;

said first wall forming a first portion, adjacent to said opening, having a curved cross sectional shape;

the first wall having a second portion extending radially outward from said first portion; said second portion being arranged adjacent to the shroud of the fan assembly so that a small, annular gap is created between the second portion of the casing and the shroud of the fan assembly; at least a portion of each of said first wall and said second wall being inclined downwardly in a radially outward direction; and said tubular side wall being inclined with respect to an axis of rotation of the fan assembly so that a bottom portion of the side wall is spaced further from said axis of the fan.

* * * * *